United States Patent
Takauji et al.

(10) Patent No.: US 11,811,072 B2
(45) Date of Patent: Nov. 7, 2023

(54) POROUS STRUCTURE, INSULATING LAYER, ELECTRODE, POWER STORAGE ELEMENT, METHOD FOR MANUFACTURING POROUS STRUCTURE, APPARATUS FOR MANUFACTURING POROUS STRUCTURE, CARRIER, SEPARATION LAYER, AND REACTION LAYER

(71) Applicant: RICOH COMPANY, LTD., Tokyo (JP)

(72) Inventors: Keigo Takauji, Kanagawa (JP); Toru Ushirogochi, Kanagawa (JP); Miku Ohkimoto, Kanagawa (JP); Naoki Sugihara, Kanagawa (JP); Daisuke Nose, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 260 days.

(21) Appl. No.: 17/132,206

(22) Filed: Dec. 23, 2020

(65) Prior Publication Data
US 2021/0202953 A1    Jul. 1, 2021

(30) Foreign Application Priority Data

Dec. 25, 2019  (JP) .................................. 2019-233858
Oct. 30, 2020   (JP) .................................. 2020-183129

(51) Int. Cl.
*H01M 4/88*    (2006.01)
*H01M 4/86*    (2006.01)
(Continued)

(52) U.S. Cl.
CPC .............. *H01M 4/88* (2013.01); *C08J 9/286* (2013.01); *H01M 4/8605* (2013.01);
(Continued)

(58) Field of Classification Search
CPC ...... B32B 5/145; B32B 5/245; C08J 2333/10; C08J 9/286; H01G 11/52; H01M 10/052;
(Continued)

(56) References Cited

U.S. PATENT DOCUMENTS

2003/0213744 A1*  11/2003  Kools ................ B01D 67/0088
                                                                    210/500.21
2004/0038808 A1    2/2004  Hampden-Smith et al.
(Continued)

FOREIGN PATENT DOCUMENTS

CN     108448032      8/2018
CN     109935777      6/2019
(Continued)

OTHER PUBLICATIONS

BASF Product Information, Ultrason(R) E 1010 NAT, Feb. 2023. (Year: 2023).*

(Continued)

*Primary Examiner* — Hai Vo
(74) *Attorney, Agent, or Firm* — Grüneberg and Myers PLLC

(57) ABSTRACT

A porous structure having pores communicating with each other is provided. The porous structure includes a porous structure portion A comprising a resin A and a porous structure portion B comprising a resin B. The porous structure portion A and the porous structure portion B are continuously integrated, and the resin A and the resin B are composed of different constituents.

16 Claims, 3 Drawing Sheets

(51) Int. Cl.
*H01M 50/403* (2021.01)
*H01M 50/411* (2021.01)
*H01M 50/42* (2021.01)
*H01M 50/449* (2021.01)
*H01M 50/46* (2021.01)
*C08J 9/28* (2006.01)
*B32B 5/24* (2006.01)
*B32B 5/14* (2006.01)

(52) U.S. Cl.
CPC ....... *H01M 50/403* (2021.01); *H01M 50/411* (2021.01); *H01M 50/42* (2021.01); *H01M 50/449* (2021.01); *H01M 50/46* (2021.01); *B32B 5/145* (2013.01); *B32B 5/245* (2013.01); *C08J 2333/10* (2013.01)

(58) Field of Classification Search
CPC .... H01M 4/8605; H01M 4/88; H01M 50/403; H01M 50/411; H01M 50/42; H01M 50/449; H01M 50/46; Y02E 60/10; Y02E 60/50
See application file for complete search history.

(56) References Cited

U.S. PATENT DOCUMENTS

| | | |
|---|---|---|
| 2006/0269824 A1 | 11/2006 | Hampden-Smith et al. |
| 2006/0292434 A1 | 12/2006 | Hampden-Smith et al. |
| 2010/0173295 A1* | 7/2010 | Lenz .................... G01N 1/30 |
| | | 435/40.5 |
| 2013/0020117 A1* | 1/2013 | Yamato .................. C08J 7/046 |
| | | 428/318.6 |
| 2013/0193075 A1* | 8/2013 | Liang .................... B01D 71/68 |
| | | 210/493.5 |
| 2018/0233727 A1 | 8/2018 | Sakurai et al. |
| 2018/0261827 A1 | 9/2018 | Yanagita et al. |
| 2019/0051879 A1 | 2/2019 | Lee et al. |
| 2019/0288259 A1 | 9/2019 | Ohkimoto et al. |
| 2020/0070519 A1* | 3/2020 | Tominaga ................ B32B 5/26 |
| 2020/0119333 A1 | 4/2020 | Masuzawa et al. |
| 2020/0220160 A1 | 7/2020 | Nakajima et al. |
| 2020/0235375 A1 | 7/2020 | Nakajima et al. |
| 2020/0243851 A1 | 7/2020 | Takauji et al. |
| 2020/0358066 A1* | 11/2020 | Kai ..................... H01M 50/446 |

FOREIGN PATENT DOCUMENTS

| | | |
|---|---|---|
| WO | WO 2015/190264 A1 | 12/2015 |
| WO | WO 2019/124276 A1 | 6/2019 |

OTHER PUBLICATIONS

Extended European Search Report dated Apr. 28, 2021 in European Patent Application No. 20215957.0, 11 pages.
Chinese Office Action dated Jul. 26, 2022 in Chinese Application No. 202011492488.6, with English abstract, 13 pages.

* cited by examiner

POROUS STRUCTURE, INSULATING LAYER, ELECTRODE, POWER STORAGE ELEMENT, METHOD FOR MANUFACTURING POROUS STRUCTURE, APPARATUS FOR MANUFACTURING POROUS STRUCTURE, CARRIER, SEPARATION LAYER, AND REACTION LAYER

CROSS-REFERENCE TO RELATED APPLICATIONS

This patent application is based on and claims priority pursuant to 35 U.S.C. § 119(a) to Japanese Patent Application Nos. 2019-233858 and 2020-183129, filed on Dec. 25, 2019 and Oct. 30, 2020, respectively, in the Japan Patent Office, the entire disclosure of each of which is hereby incorporated by reference herein.

BACKGROUND

Technical Field

The present disclosure relates to a porous structure, an insulating layer, an electrode, a power storage element, a method for manufacturing a porous structure, an apparatus for manufacturing a porous structure, a carrier, a separation layer, and a reaction layer.

Description of the Related Art

Generally, porous structures are used for various applications. As an example, a porous structure provides a separation layer that permeates or blocks only a specific substance by appropriately selecting the shape and size of the pores, surface properties of the frame portion, etc., of the porous structure. As another example, a porous structure provides an efficient reaction field or storage place for gases or liquids taken in from the outside by utilizing the vast surface area and void volume of the porous structure.

When used for such applications, the porous structure is required to have a structure that easily takes in liquids or gases from the outside and to have sufficient strength in any environment. To provide a separation layer, a reaction field, etc., having advanced functions, there is also a demand for a technique for laminating porous structures different in various properties such as the pore shape, pore size, surface properties of the frame portion, surface wettability, and heat resistance.

SUMMARY

In accordance with some embodiments of the present invention, a porous structure having pores communicating with each other is provided. The porous structure includes a porous structure portion A comprising a resin A and a porous structure portion B comprising a resin B. The porous structure portion A and the porous structure portion B are continuously integrated, and the resin A and the resin B are composed of different constituents.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
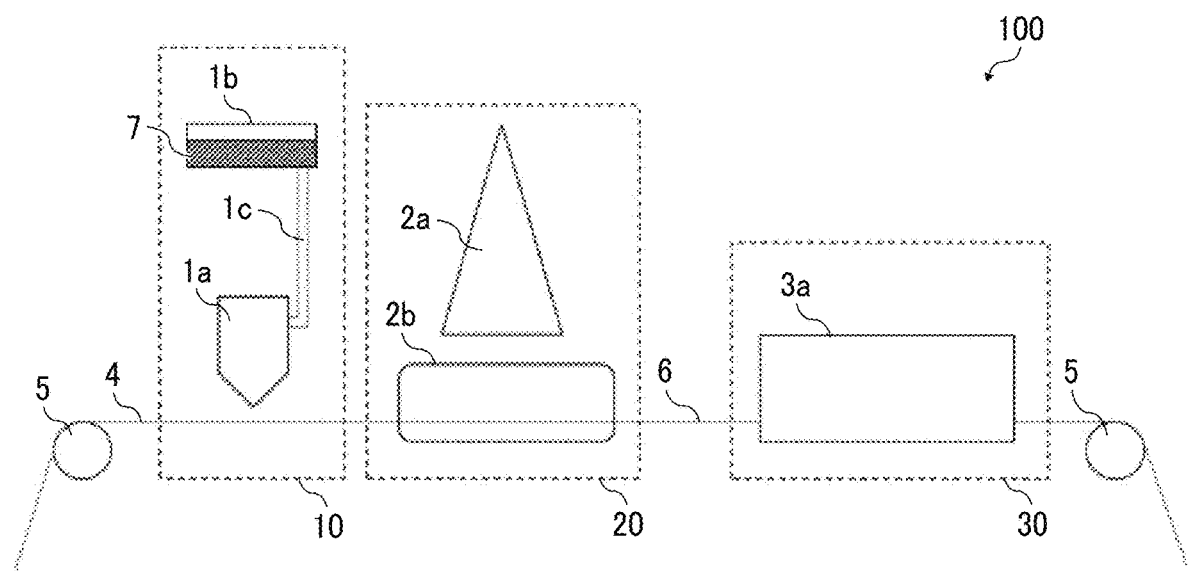
FIG. 1 is a schematic diagram of an apparatus for manufacturing a porous structure for practicing a method for manufacturing a porous structure according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to an embodiment of the present invention, a porous structure having excellent strength and communicability is provided that includes a plurality of porous structure portions formed of resins composed of different constituents.

Hereinafter, one embodiment of the present invention is described.

Porous Structure

The porous structure according to an embodiment of the present invention includes a plurality of pores. These pores communicate with each other, in other words, these pores continuously connect to each other. Such a structure is also referred to as a bicontinuous structure or a monolith structure. Each one of the pores connects to other surrounding pores, thereby exhibiting communicability. Continuous pores are three-dimensionally spread. Such a porous structure enables liquids or gases to sufficiently permeate, efficiently providing a substance separation function or a reaction field. When the porous structure is used as an insulating layer in a power storage element, permeability of electrolytic solutions and ions is improved while the positive electrode and the negative electrode are insulated from each other, and an internal reaction of the power storage element efficiently proceeds.

Whether the pores communicate with each other can be confirmed by observing a cross-sectional image of the porous structure with a scanning electron microscope (SEM) to confirm whether the pores continuously connect to each other. One physical property obtained when the pores communicate with each other is the air permeability. The air permeability of the porous structure can be measured according to Japanese Industrial Standards (JIS) P8117. The air permeability is preferably 1,000 seconds/100 mL or less, more preferably 500 seconds/100 mL or less, and particularly preferably 300 seconds/100 mL or less. In this case, the air permeability can be measured using a Gurley densometer (manufactured by Toyo Seiki Seisaku-sho, Ltd.). It can be determined that the pores communicate with each other when the air permeability is, for example, 1,000 seconds/100 mL or less.

The cross-sectional shape of the pores is not particularly limited and may be, for example, a substantially circular shape, a substantially elliptical shape, or a substantially polygonal shape. The size of the pores is also not particularly limited. Here, the size of a pore refers to the length of the longest straight line that can be drawn on the cross-sectional shape of the pore. The size of the pores can be determined from a cross-sectional image taken with a scanning electron microscope (SEM). The size of the pores of the porous structure is preferably 0.1 µm or more and 10 µm or less, and more preferably 0.1 µm or more and 1 µm or less. When the size of the pores is 0.1 µm or more and 10 µm or less, the porous structure enables liquids or gases to sufficiently permeate, efficiently providing a substance separation function or a reaction field. As will be described later, when the porous structure with a pore size of 10 µm or less is used as an insulating layer of a power storage element, the occurrence of a short circuit between the positive electrode and the negative electrode due to lithium dendrite generated inside the power storage element is prevented, improving safety. The porosity of the porous structure is preferably 30% or more, and more preferably 50% or more. The porosity of the porous structure is preferably 90% or less, and more preferably 85% or less. When the porosity is 30% or more, the porous structure enables liquids or gases to sufficiently permeate, efficiently providing a substance separation function or a reaction field. When the porous structure is used as an insulating layer in a power storage element, permeability of electrolytic solutions and ions is improved, and an internal reaction of the power storage element efficiently proceeds. When the porosity is 90% or less, the strength of the porous structure is improved. A method for measuring the porosity of the porous structure is not particularly limited. For example, the porosity can be measured by making the porous structure filled with an unsaturated fatty acid (e.g., commercially available butter) and stained with osmium, then cutting out an internal cross-sectional structure using a focused ion beam (FIB) and observing it with SEM to measure the porosity.

The porous structure of the present embodiment includes a porous structure portion A and a porous structure portion B. Each of the porous structure portion A and the porous structure portion B is a region that constitutes a part of the porous structure containing pores communicating with each other. Therefore, each of the porous structure portion A and the porous structure portion B also contains pores communicating with each other. The porous structure portion A is formed of a resin A, and the porous structure portion B is formed of a resin B. In other words, the frame portion (the portion other than the pores) of the porous structure portion A contains the resin A, and if necessary, further contains other materials. The frame portion (the portion other than the pores) of the porous structure portion B contains the resin B, and if necessary, further contains other materials. The porous structure portion A and the porous structure portion B each preferably having a porosity of 30% or more, and more preferably 50% or more. In addition, the porous structure portion A and the porous structure portion B each preferably have a porosity of 90% or less, and more preferably 85% or less.

In the porous structure of the present embodiment, the resin A forming the porous structure portion A and the resin B forming the porous structure portion B are composed of different constituents. Since the resin A and the resin B are composed of different constituents, the porous structure of the present embodiment can provide functions which are difficult for a porous structure composed of a single constituent. Here, "the resin A and the resin B are composed of different constituents" means that "the resin A and the resin B have different chemical structures". Examples of cases where the chemical structures are different include, but are not limited to: a case where the resin A and the resin B are synthesized using different types of polymerizable compounds; a case where the resin A and the resin B are synthesized using different types of polymerization initiators; a case where the resin A and the resin B are synthesized using polymerizable compounds in different amounts; a case where the resin A and the resin B are synthesized using polymerization initiators in different amounts; a case where the resin A and the resin B are synthesized using polymerizable compounds in different compounding ratios; a case where the resin A and the resin B are synthesized using polymerization initiators in different compounding ratios; and combinations of theses cases. That is, the difference in constituents not only means a difference in chemical structure of structural units of the resins but also a difference in chemical structure based on the degree of polymerization. When the type, amount, or compounding ratio of the polymerization initiator is different, the type, amount, or compounding ratio of the structure derived from the polymerization initiator incorporated into a part of the chemical structure of the resin is also different. Such a difference is also included in the meaning of the difference in constituents. Generally, when the resin A and the resin B have different chemical structures, the resin A and the resin B also have different physical properties. Examples of the physical properties include, but are not limited to, glass transition temperature, melting point, wettability, hardness, and scratch resistance.

As long as the resin A and the resin B have different chemical structures, the liquid composition A that forms the resin A by polymerization and the liquid composition B that forms the resin B by polymerization have different compositions.

As an example of the case where the resin A and the resin B have different chemical structures and therefore have different physical properties, a case where the resin A and the resin B are different in hardness or scratch resistance is described below. For example, in a case in which the porous structure is in a layer-like (in other words, film-like) shape and one surface of the porous structure is formed of the porous structure portion A formed of the resin A and the other surface is formed of the porous structure portion B formed of the resin B, it is assumed that one of the surfaces is required to have high hardness or scratch resistance for contact with an external member. In such a case, it is preferable that the hardness or scratch resistance of one of the resin A and the resin B which comes into contact with the external member be higher than the hardness or scratch resistance of the other resin. In other words, it is preferable that the hardness or scratch resistance of one of the porous structure portion A and the porous structure portion B which comes into contact with the external member be higher than the hardness or scratch resistance of the other porous structure portion. The porous structure having such physical properties has a substantially higher degree of hardness or scratch resistance compared to a porous structure obtained by applying a mixture of the liquid composition A and the liquid composition B and curing the mixture. The hardness can be measured by, for example, measuring the indentation hardness using a thin film hardness tester (nanoindenter). The scratch resistance can be measured by, for example, a pencil hardness test.

A resin having high hardness or scratch resistance and a porous structure portion formed of this resin can be produced by, for example, increasing the proportion of polymerizable compounds in the liquid composition.

In the porous structure of the present embodiment, the porous structure portion A and the porous structure portion B are continuously integrated. "The porous structure portion A and the porous structure portion B are continuously integrated" means that "the resin A forming the porous structure portion A and the resin B forming the porous structure portion B are integrated via an intermediate layer". Here, the intermediate layer is a layer formed of a resin formed by polymerizing "a mixture of the liquid composition A that forms the resin A by polymerization and the liquid composition B that forms the resin B by polymerization". In other words, the intermediate layer is formed of "a resin having a structural unit derived from the polymerizable compound contained in the liquid composition A and a structural unit derived from the polymerizable compound contained in the liquid composition B". Here, the resin A and the resin B have different chemical structures. The chemical structure of the resin constituting the intermediate layer is not limited to one type. For example, the chemical structure of the resin constituting the intermediate layer may gradually changes from a chemical structure similar to the resin A to a chemical structure similar to the resin B. The intermediate layer may include a plurality of intermediate layers. The intermediate layer also contains pores communicating with each other, like the porous structure portion A and the porous structure portion B. The pores are continuous between the porous structure portion A and the intermediate layer, and the pores are continuous between the porous structure portion B and the intermediate layer.

Whether the porous structure portion A and the porous structure portion B are continuously integrated can be confirmed by, for example, observing a cross-sectional image of the porous structure to confirm that there is no interface between the porous structure portion A and the porous structure portion B. When the porous structure portion A and the porous structure portion B are continuously integrated, no interface is formed between the porous structure portion A and the porous structure portion B, so that a decrease in strength due to the occurrence of peeling at the interface is reduced. Further, since the intermediate layer contains pores communicating with each other, a decrease in pore communicability in the intermediate layer is reduced and permeation inhibition of gases, liquids, and ions is suppressed. Other than the technique of observing a cross-sectional image, whether the porous structure portion A and the porous structure portion B are continuously integrated can be confirmed by a component analysis of the porous structure portion A, the porous structure portion B, and the intermediate layer.

The case where the porous structure portion A and the porous structure portion B are not continuously integrated includes, for example, a case where the porous structure portion A and the porous structure portion B are laminated or adhered, and a case where the porous structure portion A and the porous structure portion B are integrated via a region in which the resin A and the resin B are mixed (this region does not correspond to the intermediate layer because the above-described resin formed by polymerization of the mixture is not contained).

The shape of the porous structure of the present embodiment is appropriately selected to suit to a particular application. Preferably, the porous structure is in a layer-like (in other words, film-like) shape. When the porous structure is in a layer-like shape, the shapes of the porous structure portion A and the porous structure portion B are appropriately selected to suit to a particular application, and may be a layer-like shape having a substantially uniform thickness in the plane direction of the porous structure. Alternatively, the porous structure may be in a layer-like shape only in a part. The porous structure portion A and the porous structure portion B may be repeatedly arranged via the intermediate layer. The shapes of the porous structure portion A and the porous structure portion B are not particularly limited as long as the porous structure portion A and the porous structure portion B are continuously integrated. For example, the porous structure portion A and the porous structure portion B may be adjacent to each other via the intermediate layer in the plane direction of the porous structure.

Resin

The resin A forming the porous structure portion A and the resin B forming the porous structure portion B (hereinafter may be collectively referred to as the "resins") are described in detail below. The resins are not particularly limited, and resins which can be formed by irradiation with active energy rays such as ionizing radiation, ultraviolet rays, and infrared rays (heat) may be used. Specific examples of such resins include, but are not limited to, acrylate resins, methacrylate resins, urethane acrylate resins, vinyl ester resins, unsaturated polyester resins, epoxy resins, oxetane resins, vinyl ether resins, and resins formed by an ene-thiol reaction. Among these, acrylate resins, methacrylate resins, urethane acrylate resins, and vinyl ester resins, which can be formed by a radical polymerization at high reactivity, are preferred; and (meth)acrylic resins such as acrylate resins and methacrylate resins are more preferred.

Preferably, the resins are those which can be formed by irradiation with ionizing radiation and ultraviolet rays. Such resins are instantly formed upon irradiation with ionizing radiation and ultraviolet rays. Therefore, in a case in which the liquid composition A is applied onto the liquid composition B and then irradiated with active energy rays or in a case in which the liquid composition B is applied onto the liquid composition A and then irradiated with active energy rays, the proportion of the intermediate layer, as formed upon irradiation of the mixture of the liquid composition A and the liquid composition B with active energy rays, is reduced. As a result, the proportions of the porous structure portion A and the porous structure portion B are increased, and functions exhibited by the presence of the porous structure portion A and the porous structure portion B, which are difficult for a single porous structure to exhibit, are improved.

Liquid Composition

The liquid composition A that forms the resin A by polymerization and the liquid composition B that forms the resin B by polymerization (hereinafter may be collectively referred to as the "liquid compositions") preferably contain a polymerizable compound, a solvent, and a polymerization initiator.

The liquid composition forms a porous structure portion by curing. In the present embodiment, forming a porous structure portion by curing means not only forming a porous structure portion in the liquid composition but also forming a porous structure precursor in the liquid composition and then forming a porous structure in a subsequent process (e.g., heating process). It also includes forming a porous structure by curing the entire liquid composition, and further includes forming a porous structure by curing (polymerizing) a part of components (e.g., polymerizable compounds) of the liquid composition while forming no porous structure by not curing the other components (e.g., solvent) of the liquid composition.

Polymerizable Compound

The polymerizable compound forms a resin by polymerizing. The polymerizable compound forms a porous structure by polymerizing in the liquid composition. Preferably, the polymerizable compound forms a resin by being irradiated with active energy rays. Preferably, the polymerizable compound is a difunctional or higher functional polymerizable compound to form a resin having an intramolecular cross-linked structure. In this case, the glass transition temperature or melting point of the porous structure portion is increased, and as a result, the strength is improved.

The active energy rays are not particularly limited as long as they can impart energy necessary for proceeding a polymerization reaction of the polymerizable compound in the liquid composition. Examples thereof include, but are not limited to, ultraviolet rays, electron beams, α-rays, β-rays, γ-rays, and X-rays. Among these, ultraviolet rays are preferred. Particularly when a high-energy light source is used, the polymerization reaction can proceed without using any polymerization initiator.

Preferably, the polymerizable compound has at least one radical-polymerizable functional group. Examples thereof include, but are not limited to, monofunctional, difunctional, and trifunctional or higher radical-polymerizable compounds, functional monomers, and radical-polymerizable oligomers. Among these compounds, difunctional or higher radical-polymerizable compounds are preferred.

Specific examples of the monofunctional radical-polymerizable compounds include, but are not limited to, 2-(2-ethoxyethoxy)ethyl acrylate, methoxypolyethylene glycol monoacrylate, methoxypolyethylene glycol monomethacrylate, phenoxypolyethylene glycol acrylate, 2-acryloyloxyethyl succinate, 2-ethylhexyl acrylate, 2-hydroxyethyl acrylate, 2-hydroxypropyl acrylate, tetrahydrofurfuryl acrylate, 2-ethylhexylcarbitol acrylate, 3-methoxybutyl acrylate, benzyl acrylate, cyclohexyl acrylate, isoamyl acrylate, isobutyl acrylate, methoxytriethylene glycol acrylate, phenoxytetraethylene glycol acrylate, cetyl acrylate, isostearyl acrylate, stearyl acrylate, and styrene monomer. Each of these can be used alone or in combination with others.

Specific examples of the difunctional radical-polymerizable compounds include, but are not limited to, 1,3-butanediol diacrylate, 1,4-butanediol diacrylate, 1,4-butanediol dimethacrylate, 1,6-hexanediol diacrylate, 1,6-hexanediol dimethacrylate, diethylene glycol diacrylate, polyethylene glycol diacrylate, neopentyl glycol diacrylate, EO-modified bisphenol A diacrylate, EO-modified bisphenol F diacrylate, neopentyl glycol diacrylate, and tricyclodecane dimethanol diacrylate. Each of these can be used alone or in combination with others.

Specific examples of the trifunctional or higher radical-polymerizable compounds include, but are not limited to, trimethylolpropane triacrylate (TMPTA), trimethylolpropane trimethacrylate, EO-modified trimethylolpropane triacrylate, PO-modified trimethylolpropane triacrylate, caprolactone-modified trimethylolpropane triacrylate, HPA-modified trimethylolpropane trimethacrylate, pentaerythritol triacrylate, pentaerythritol tetraacrylate (PETTA), glycerol triacrylate, ECH-modified glycerol triacrylate, EO-modified glycerol triacrylate, PO-modified glycerol triacrylate, tris(acryloxyethyl) isocyanurate, dipentaerythritol hexaacrylate (DPHA), caprolactone-modified dipentaerythritol hexaacrylate, dipentaerythritol hydroxypentaacrylate, alkyl-modified dipentaerythritol pentaacrylate, alkyl-modified dipentaerythritol tetraacrylate, alkyl-modified dipentaerythritol triacrylate, dimethylolpropane tetraacrylate (DTMPTA), pentaerythritol ethoxytetraacrylate, EO-modified phosphoric triacrylate, and 2,2,5,5-tetrahydroxymethylcyclopentanone tetraacrylate. Each of these can be used alone or in combination with others.

The proportion of the polymerizable compound in the liquid composition is preferably 5.0% by mass or more and 70.0% by mass or less, more preferably 10.0% by mass or more and 50.0% by mass or less, and even more preferably 20.0% by mass or more and 40.0% by mass or less. When the proportion of the polymerizable compound is 70.0% by mass or less, the pore size of the resulting porous structure portion is not too small, which is several nanometers or less, and the porous structure portion is given an appropriate porosity which avoids poor permeation of liquids or gases. When the proportion of the polymerizable compound is 5.0% by mass or more, a three-dimensional network structure is sufficiently formed in the resin to sufficiently form the porous structure, and the strength of the resulting porous structure portion is advantageously improved.

When it is desired to obtain a resin having high hardness or scratch resistance and a porous structure portion formed of this resin, the proportion of the polymerizable compound in the liquid composition is preferably 30.0% by mass or more and 70.0% by mass or less, more preferably 40.0% by mass or more and 70.0% by mass or less, and even more preferably 50.0% by mass or more and 70.0% by mass or less. This is because a resin having high hardness or scratch resistance and a porous structure portion formed of this resin can be obtained by increasing the proportion of the polymerizable compound in the liquid composition. The proportion of the polymerizable compound in the liquid composition may be within the above-described range only in at least one of the liquid composition A and the liquid composition B.

Solvent

The solvent (hereinafter also referred to as "porogen") is a liquid that is compatible with the polymerizable compound. The solvent is a liquid that becomes incompatible (causes phase separation) with the resulting polymer (resin) in the process of polymerizing the polymerizable compound in the liquid composition. The inclusion of the solvent in the liquid composition allows the polymerizable compound to form a porous structure portion when polymerized in the liquid composition. It is preferable that the solvent be capable of dissolving a compound (i.e., polymerization initiator to be described later) that generates radicals or acids by light or heat. One type of solvent may be used alone, or two or more types of solvents may be used in combination. The solvent is not polymerizable.

One type of porogen alone or a combination of two or more types of porogens has a boiling point of preferably 50 degrees C. or higher and 250 degrees C. or lower, and more preferably 70 degrees C. or higher and 200 degrees C. or lower, at normal pressure. When the boiling point is 50 degrees C. or higher, vaporization of the porogen at around room temperature is suppressed, handling of the liquid composition becomes easy, and the amount of porogen in the liquid composition can be easily controlled. When the boiling point is 250 degrees C. or lower, the time required for drying the porogen after polymerization is shortened, and the productivity of the porous structure is improved. Since the amount of porogen remaining inside the porous structure portion is reduced, the quality of the porous structure is improved when used as a functional layer such as a separation layer for separating substances or a reaction layer as a reaction field.

Further, one type of porogen alone or a combination of two or more types of porogens has a boiling point preferably 120 degrees C. or higher at normal pressure.

Specific examples of the porogen include, but are not limited to: ethylene glycols such as diethylene glycol monomethyl ether, ethylene glycol monobutyl ether, ethylene glycol monoisopropyl ether, and dipropylene glycol monomethyl ether; esters such as γ-butyrolactone and propylene carbonate; and amides such as N,N-dimethylacetamide. Specific examples thereof further include liquids having a relatively large molecular weight, such as methyl tetradecanoate, methyl decanoate, methyl myristate, and tetradecane. Specific examples thereof further include liquids such as acetone, 2-ethylhexanol, and 1-bromonaphthalene.

It should be noted that the above-described liquids do not always serve as a porogen. As described above, the porogen is a liquid that is compatible with the polymerizable compound and becomes incompatible (causes phase separation) with the resulting polymer (resin) in the process of polymerizing the polymerizable compound in the liquid composition. In other words, whether or not a liquid serves as a porogen depends on the relation between the polymerizable compound and the resulting polymer (the resin formed by polymerization of the polymerizable compound).

The liquid composition only needs to contain at least one porogen having the above-described specific relation with the polymerizable compound. Therefore, the liquid composition may further additionally contain a liquid (non-porogen liquid) that does not have the above-described specific relation with the polymerizable compound. The proportion of the liquid (non-porogen liquid) that does not have the above-described specific relation with the polymerizable compound in the liquid composition is preferably 10.0% by mass or less, more preferably 5.0% by mass or less, and even more preferably 1.0% by mass or less. Particularly preferably, such a liquid is not contained in the liquid composition.

The proportion of the porogen in the liquid composition is preferably 30.0% by mass or more and 95.0% by mass or less, more preferably 50.0% by mass or more and 90.0% by mass or less, and even more preferably 60.0% by mass or more and 80.0% by mass or less. When the proportion of the porogen is 30.0% by mass or more, the pore size of the resulting porous structure portion is not too small, which is several nanometers or less, and the porous structure is given an appropriate porosity which avoids poor permeation of liquids or gases. When the proportion of the porogen is 95.0% by mass or less, a three-dimensional network structure is sufficiently formed in the resin to sufficiently form the porous structure, and the strength of the resulting porous structure portion is advantageously improved.

When it is desired to obtain a resin having high hardness or scratch resistance and a porous structure portion formed of this resin, the proportion of the polymerizable compound in the liquid composition is preferably 30.0% by mass or more and 70.0% by mass or less, more preferably 30.0% by mass or more and 60.0% by mass or less, and even more preferably 30.0% by mass or more and 50.0% by mass or less. This is because a resin having high hardness or scratch resistance and a porous structure portion formed of this resin can be obtained by increasing the proportion of the polymerizable compound in the liquid composition and thereby decreasing the proportion of the porogen in the liquid composition. The proportion of the porogen in the liquid composition may be within the above-described range only in at least one of the liquid composition A and the liquid composition B.

The mass ratio between the polymerizable compound and the porogen (polymerizable compound:porogen) in the liquid composition is preferably from 1.0:0.4 to 1.0:19.0, more preferably from 1.0:1.0 to 1.0:9.0, and even more preferably from 1.0:1.5 to 1.0:4.0.

When it is desired to obtain a resin having high hardness or scratch resistance and a porous structure portion formed of this resin, the mass ratio between the polymerizable compound and the porogen (polymerizable compound:porogen) in the liquid composition is preferably from 1.0:0.4 to 1.0:0.9, more preferably from 1.0:0.4 to 1.0:0.8, and even more preferably from 1.0:0.4 to 1.0:0.7. This is because a resin having high hardness or scratch resistance and a porous structure portion formed of this resin can be obtained by increasing the proportion of the polymerizable compound to the porogen. The mass ratio between the polymerizable compound and the porogen may be within the above-described range only in at least one of the liquid composition A and the liquid composition B.

Polymerization Initiator

A polymerization initiator is a material capable of generating active species such as radicals and cations by energy such as light and heat to initiate a polymerization of the polymerizable compound. As such a polymerization initiator, known radical polymerization initiators, cationic polymerization initiators, and base generators can be used singly or in combination of two or more. Among them, photoradical polymerization initiators are preferred.

As the photoradical polymerization initiator, photoradical generators can be used. Specific preferred examples thereof include, but are not limited to, photoradical polymerization initiators such as Michler's ketone and benzophenone known by the trade names IRGACURE and DAROCUR. More specific examples thereof include benzophenone and acetophenone derivatives, such as α-hydroxy- or α-aminoacetophenone, 4-aroyl-1,3-dioxolane, benzyl ketal, 2,2-diethoxyacetophenone, p-dimethyl aminoacetophenone, p-dimethylaminopropiophenone, benzophenone, 2-chlorobenzophenone, pp'-dichlorobenzophenone, pp'-bisdiethylaminobenzophenone, Michler's ketone, benzyl, benzoin, benzyl dimethyl ketal, tetramethylthiuram monosulfide, thioxanthone, 2-chlorothioxanthone, 2-methylthioxanthone, azobisisobutyronitrile, benzoin peroxide, di-tert-butyl peroxide, 1-hydroxycyclohexylphenyl ketone, 2-hydroxy-2-methyl-1-phenyl-1-one, 1-(4-isopropylphenyl)-2-hydroxy-2-methylpropane-1-one, methylbenzoyl formate, benzoin isopropyl ether, benzoin methyl ether, benzoin ethyl ether, benzoin ether, benzoin isobutyl ether, benzoin n-butyl ether, benzoin n-propyl, 1-hydroxy-cyclohexyl-phenyl-ketone, 2-benzyl-2-dimethylamino-1-(4-morpholinophenyl)-butanone-1, 1-hydroxy-cyclohexyl-phenyl-ketone, 2,2-dimethoxy-1,2-diphenylethane-1-one, bis($\eta$5-2,4-cyclopentadiene-1-yl)-bis(2,6-difluoro-3-(1H-pyrrole-1-yl)-phenyl)titanium, bis(2,4,6-trimethylbenzoyl)-phenylphosphine oxide, 2-methyl-1-[4-(methylthio)phenyl]-2-morpholinopropane-1-one, 2-hydroxy-2-methyl-1-phenyl-propane-1-one (DAROCUR 1173), bis(2,6-dimethoxybenzoyl)-2,4,4-trimethyl-pentylphosphine oxide, 1-[4-(2-hydroxyethoxy)-phenyl]-2-hydroxy-2-methyl-1-propane-1-onemonoacylphosphine oxide, bisacylphosphine oxide, titanocene, fluorescein, anthraquinone, thioxanthone or xanthone, lophine dimer, trihalomethyl compounds or dihalomethyl compounds, active ester compounds, organoboron compounds.

Furthermore, photo-cross-linkable radical generators such as bisazide compounds may be used in combination. In the case of polymerization only by heat, thermal polymerization initiators such as azobisisobutyronitrile (AIBN), which is a typical radical generator, can be used.

For a sufficient curing rate, the proportion of the polymerization initiator to 100.0% by mass of the polymerizable compound is preferably 0.05% by mass or more and 10.0% by mass or less, more preferably 0.5% by mass or more and 5.0% by mass or less.

Physical Properties of Liquid Composition

In view of workability when applying the liquid composition, the liquid composition preferably has a viscosity at 25 degrees C. of 1.0 mPa·s or more and 200.0 mPa·s or less, more preferably 1.0 mPa·s or more and 150.0 mPa·s, even more preferably 1.0 mPa·s or more and 30.0 mPa·s or less, and particularly preferably 1.0 mPa·s or more and 25.0 mPa·s or less. When the viscosity of the liquid composition is 1.0 mPa·s or more and 200.0 mPa·s or less, dischargeability of the liquid composition is good even with an inkjet method. The viscosity can be measured using a viscometer (RE-550L manufactured by Toki Sangyo Co., Ltd.).

Apparatus and Method for Manufacturing Porous Structure

FIG. 1 is a schematic diagram of an apparatus for manufacturing a porous structure for practicing a method for manufacturing a porous structure according to an embodiment of the present invention.

Apparatus for Manufacturing Porous Structure

A porous structure manufacturing apparatus 100 is configured to manufacture a porous structure using the above-described liquid composition. The porous structure manufacturing apparatus 100 includes an application process unit 10, a polymerization process unit 20, and a heating process unit 30. The application process unit 10 performs a process of applying the liquid composition to a substrate 4 to form a liquid composition layer. The polymerization process unit 20 performs a process of polymerizing the polymerizable compound contained in the liquid composition layer on the substrate 4 to obtain a porous structure precursor 6. The heating process unit 30 performs a process of heating the porous structure precursor 6 to obtain a porous structure. The porous structure manufacturing apparatus 100 further includes a conveyance unit 5 that conveys the substrate 4. The conveyance unit 5 conveys the substrate 4 through the application process unit 10, the polymerization process unit 20, and the heating process unit 30, in that order, at a preset speed.

Application Process Unit

The application process unit 10 includes an applying device 1a, an accommodating container 1b, and a supply tube 1c. The applying device 1a is configured to perform the process of applying the liquid composition to the substrate 4. The accommodating container 1b accommodates the liquid composition. The supply tube 1c supplies the liquid composition accommodated in the accommodating container 1b to the applying device 1a. The applying device that performs the process of applying the liquid composition includes an applying device A configured to perform an application process A for applying the liquid composition A and an applying device B configured to perform an application process B for applying the liquid composition B. The liquid composition A and the liquid composition B are accommodated in separate accommodating containers 1b and supplied to separate applying devices 1a via separate supply tubes 1c.

The accommodating container 1b accommodates a liquid composition 7. In the application process unit 10, the applying device 1a discharges the liquid composition 7 toward the substrate 4, thereby applying the liquid composition 7 to the substrate 4 to from a thin liquid composition layer. At this time, the order of execution of the application process A and the application process B is not limited. Either executing the application process A first, executing the application process B first, or executing the application process A and the application process B at the same time is acceptable. It is preferable that the applied liquid composition A and the applied liquid composition B be in contact with each other in an uncured state. Specifically, in a case where the application process A is executed first, it is preferable that the liquid composition B is applied in the application process B so as to overlap at least a part of the region of the applied liquid composition A. Specifically, in a case where the application process B is executed first, it is preferable that the liquid composition A is applied in the application process A so as to overlap at least a part of the region of the applied liquid composition B. In a case where the application process A and the application process B are executed at the same time, it is preferable that regions where the liquid composition A and the liquid composition B are applied in the application process A and the application process B, respectively, be close to each other.

The accommodating container 1b may be configured either to be integrated with the porous structure manufacturing apparatus 100 or to be detachable from the porous structure manufacturing apparatus 100. Further, the accommodating container 1b may be either a container used for supplying the liquid composition to another accommodating container integrated with the porous structure manufacturing apparatus 100 or that detachable from the porous structure manufacturing apparatus 100.

The applying device 1a is not particularly limited as long as it is capable of applying the liquid composition 7. Specific examples thereof include, but are not limited to, applying apparatuses employing spin coating, casting, micro gravure coating, gravure coating, bar coating, roll coating, wire bar coating, dip coating, slit coating, capillary coating, spray coating, nozzle coating, or a printing method such as gravure printing, screen printing, flexographic printing, offset printing, reverse printing, and inkjet printing.

The accommodating container 1b and the supply tube 1c can be arbitrarily selected as long as they can reliably accommodate or supply the liquid composition 7. The accommodating container 1b and the supply tube 1c are preferably made of a material having light-shielding property in relatively short wavelength regions such as ultraviolet regions and visible light regions. In this case, the liquid composition 7 is prevented from starting a polymerization by external light.

Polymerization Process Unit

As illustrated in FIG. 1, the polymerization process unit 20 includes a light emitter 2a and a polymerization-inactive gas circulator 2b. The light emitter 2a is a curing device that performs a process of curing the liquid composition by emitting active energy rays such as heat and light thereto. The polymerization-inactive gas circulator 2b circulates a polymerization-inactive gas. The light emitter 2a emits light to the liquid composition layer formed by the application process unit 10, in the presence of a polymerization-inactive gas, to photopolymerize the liquid composition layer, thereby obtaining the porous structure precursor 6. In the curing process, the curing device simultaneously cures the applied liquid composition A and the applied liquid composition B that are in contact with each other. In the process of simultaneously curing, it is required that the curing process for the liquid composition A and the curing process for the liquid composition B overlap at least partially. It is not necessary that the timings of start of curing be the same, however, it is preferable that the timings of start of curing be substantially the same.

The light emitter 2a is not particularly limited and appropriately selected according to the absorption wavelength of the photopolymerization initiator contained in the liquid composition layer as long as it can initiate and proceed polymerization of the compounds contained in the liquid composition layer. Specific examples thereof include, but are not limited to, ultraviolet light sources such as high-pressure mercury lamp, metal halide lamp, hot cathode tube, cold cathode tube, and LED (light emitting diode). However, since light having a shorter wavelength generally tends to reach a deeper portion, it is preferable that the light source be selected according to the thickness of the porous film to be formed.

When the emission intensity of the light source of the light emitter 2a is too strong, a polymerization rapidly proceeds before the occurrence of sufficient phase separation, so that it becomes more difficult to obtain a porous structure. By contrast, when the emission intensity is too weak, a phase separation proceeds beyond the microscale, resulting in variation and coarsening of the pores. In addition, the emission time becomes longer, and the productivity tends to decrease. Therefore, the emission intensity is preferably 10 mW/cm$^2$ or more and 1 W/cm$^2$ or less, and more preferably 30 mW/cm$^2$ or more and 300 mW/cm$^2$ or less.

The polymerization-inactive gas circulator 2b has a role of lowering the concentration of oxygen, which is polymerization-active, in the atmosphere to proceed a polymerization reaction of the polymerizable compound near the surface of the liquid composition layer without any inhibition. Therefore, the polymerization-inactive gas is not particularly limited as long as it satisfies the above-described functions. Specific examples thereof include, but are not limited to, nitrogen gas, carbon dioxide gas, and argon gas.

The flow rate is determined for an efficient inhibition reduction effect. It is preferable that the O$_2$ concentration is less than 20% (an environment where the oxygen concentration is lower than that of the atmosphere), more preferably 0% or more and 15% or less, and even more preferably 0% or more and 5% or less. It is preferable that the polymerization-inactive gas circulator 2b be equipped with a temperature controller capable of controlling the temperature for providing reliable polymerization proceeding conditions.

Heating Process Unit

As illustrated in FIG. 1, the heating process unit 30 includes a heater 3a. The heating process unit 30 performs a solvent removing process in which the heater 3a heats the solvent remaining in the porous structure precursor 6 formed by the polymerization process unit 20 to dry and remove the solvent. As a result, a porous structure is formed. The heating process unit 30 may perform the solvent removing process under reduced pressure.

The heating process unit 30 also performs a polymerization promoting process and an initiator removing process. In the polymerization promoting process, the heater 3a heats the porous structure precursor 6 to further promotes the polymerization reaction performed by the polymerization process unit 20. In the initiator removing process, the heater 3a heats the photopolymerization initiator remaining in the porous structure precursor 6 to dry and remove it. The polymerization promoting process and the initiator removing process may performed before or after the solvent removing process, not at the same time as the solvent removing process.

The heating process unit 30 also performs, after the solvent removing process, a polymerization completing process in which the porous structure is heated under reduced pressure. The heater 3a is not particularly limited as long as it has the above-described functions. Examples thereof include, but are not limited to, an IR heater and a hot air heater.

The heating temperature and time can be appropriately selected according to the boiling point of the solvent contained in the porous structure precursor 6 or the thickness of the formed film.

Substrate

The substrate 4 may be made of any material regardless of whether it is transparent or opaque. Specific examples thereof include, but are not limited to: transparent substrates such as glass substrates, resin film substrates (e.g., various plastic films), and composite substrates thereof; and opaque substrates such as silicon substrates, metal substrates (e.g., stainless steel), and laminates thereof.

The substrate 4 may also be a recording medium made of, for example, plain paper, glossy paper, special paper, or cloth. The recording medium may also be a low-permeability substrate (low-absorptivity substrate). The low-permeability substrate refers to a substrate having a surface with a low level of moisture permeability, absorptivity, or adsorptivity. Examples thereof also includes a material having a number of hollow spaces inside but not opened to the exterior. Examples of the low-permeability substrate include, but are not limited to, coated papers used in commercial printing, and recording media such as paperboard in which waste paper pulp is blended into the intermediate layer and the back layer and a coating is provided on the surface.

With regard to the shape, the substrate may be in any form such as that having a curved surface or a recessed-projected shape, as long as the substrate is applicable to the application process unit 10 and the polymerization process unit 20.

Applications of Porous Structure

The porous structure of the present embodiment can be used for various applications. Non-limiting examples of applications are described in detail below.

Applications for Power Storage Element or Power Generation Element

The porous structure of the present embodiment can be used as an insulating layer (separator) for a power storage element or a power generation element. Here, the insulating layer is a member that isolates a positive electrode and a negative electrode and secures ionic conductivity between the positive electrode and the negative electrode. In the present disclosure, the insulating layer is not limited to that having a layer-like shape and may be in another shape.

When the porous structure of the present embodiment is used as an insulating layer, the place where the porous structure is formed is not particularly limited as long as it is on a member forming an electrode, such as on an electrode substrate and an electrode mixture part. In view of improved safety, it is preferable that the porous structure as an insulating layer be formed by applying the liquid composition onto an electrode mixture part that has been previously formed on an electrode substrate and then curing the liquid composition. The electrode mixture part refers to a member containing an active material. When the porous structure as an insulating layer is formed on the electrode mixture part, the occurrence of short circuit can be efficiently prevented.

A case where the porous structure of the present embodiment is used as an insulating layer is described with reference to FIGS. 2 to 4.

Figure 2:
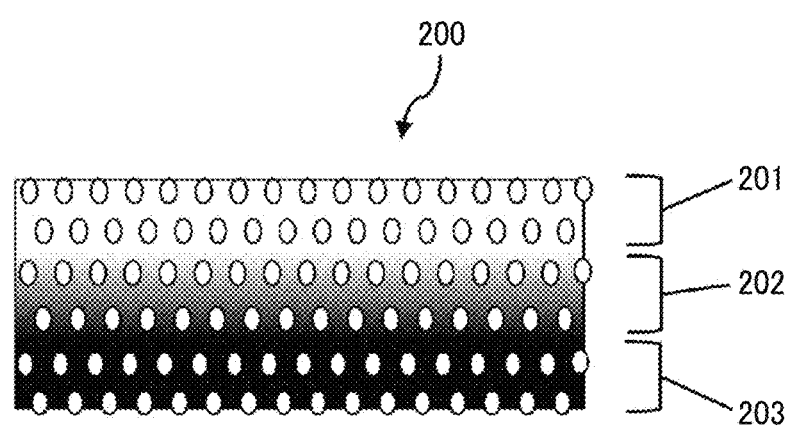
FIG. 2 is a schematic cross-sectional diagram of a porous structure according to an embodiment of the present invention used as an insulating layer.

FIG. 2 is a schematic cross-sectional diagram of the porous structure of the present embodiment used as an insulating layer. A porous structure 200 includes a porous structure portion 201 (porous structure portion A), an intermediate layer 202, and a porous structure portion 203 (porous structure portion B). As illustrated in FIG. 2, the porous structure portion 201 (porous structure portion A) and the porous structure portion 203 (porous structure portion B) are continuously integrated by the intermediate layer 202.

Figure 3:
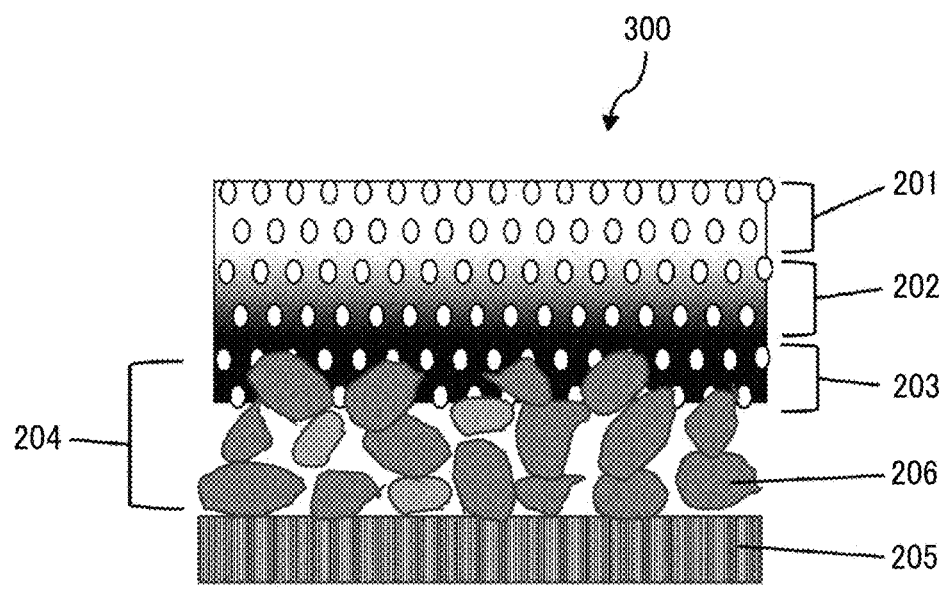
FIG. 3 is a schematic cross-sectional diagram of an electrode containing a porous structure according to an embodiment of the present invention used as an insulating layer.

FIG. 3 is a schematic cross-sectional diagram of an electrode containing the porous structure of the present embodiment used as an insulating layer. An electrode 300 includes a porous structure portion 201 (porous structure portion A), an intermediate layer 202, a porous structure portion 203 (porous structure portion B), a negative electrode mixture part 204, and a negative electrode substrate 205. The negative electrode mixture part 204 contains a negative electrode active material 206. Unlike the porous structure illustrated in FIG. 2, the porous structure illustrated in FIG. 3 is formed on the negative electrode mixture part 204. When the porous structure as an insulating layer is formed by applying the liquid composition onto an electrode mixture part that has been previously formed on an electrode substrate and then curing the liquid composition, a part of the porous structure and a part of the electrode mixture part are overlapped as illustrated in FIG. 3. This is because the liquid composition applied before curing penetrates into the electrode mixture part and then cures to form the porous structure. The penetration depth (the length in the layer thickness direction) of the overlapping region is preferably 5% or more, more preferably 30% or more, of the length in the layer thickness direction of the region of the electrode mixture part. The liquid composition before curing can be made to penetrate into the electrode mixture part by, for example, adjusting the viscosity of the liquid composition. For example, the liquid composition preferably has a viscosity at 25 degrees C. of 1.0 mPa·s or more and 200.0 mPa·s or less, more preferably 1.0 mPa·s or more and 150.0 mPa·s or less, even more preferably 1.0 mPa·s or more and 30.0 mPa·s or less, and particularly preferably 1.0 mPa·s or more and 25.0 mPa·s or less. The viscosity can be adjusted by, for example, adjusting the proportion of the polymerizable compound in the liquid composition. For example, the proportion of the polymerizable compound in the liquid composition is preferably 5.0% by mass or more and 70.0% by mass or less, more preferably 10.0% by mass or more and 50.0% by mass or less, and even more preferably 20.0% by mass or more and 40.0% by mass or less.

Figure 4:
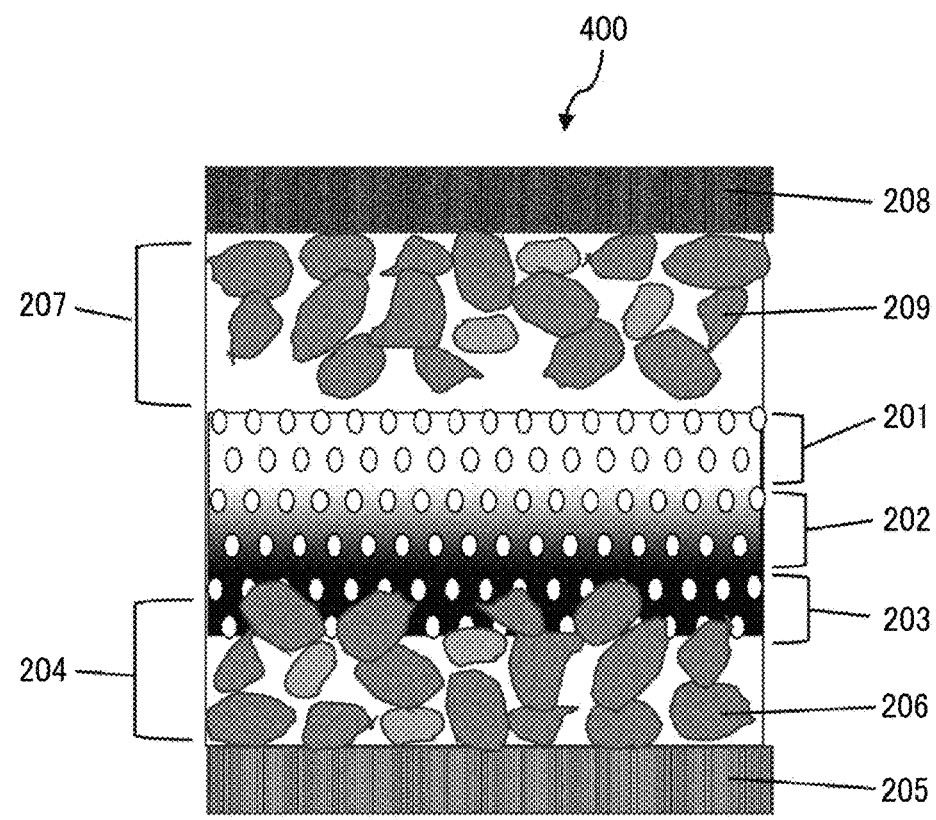
FIG. 4 is a schematic cross-sectional diagram of a power storage element containing a porous structure according to an embodiment of the present invention used as an insulating layer.

FIG. 4 is a schematic cross-sectional diagram of a power storage element containing the porous structure of the present embodiment used as an insulating layer. A power storage element 400 includes a porous structure portion 201 (porous structure portion A), an intermediate layer 202, a porous structure portion 203 (porous structure portion B), a negative electrode mixture part 204, a negative electrode substrate 205, a positive electrode mixture part 207, and a positive electrode substrate 208. The positive electrode mixture part 207 contains a positive electrode active material 209.

The porous structures as insulating layers illustrated in FIGS. 2 to 4 each contain the porous structure portion A and the porous structure portion B in layer-like shapes, but the shapes are not limited thereto. For example, the porous structure portion A and the porous structure portion B may be adjacent to each other via the intermediate layer in the plane direction of the porous structure.

Next, the reason why it is preferable to apply the porous structure of the present embodiment insulating layers of power storage elements and power generation elements is described.

In recent years, in the technical field related to power storage elements and power generation elements, demands for higher output, higher capacity, and longer lifespan, are rapidly increasing. However, in responding to these demands, there are various problems related to the safety of power storage elements and power generation elements. One example of members for which safety improvement is required is an insulating layer (separator) having a porous structure. One example of functions relating to the safety required for the insulating layer is a shutdown function. The shutdown function is a function of suppressing a reaction in a power storage element, when the power storage element generates heat, by melting the insulating layer to clog openings of the insulating layer. This function can be realized by preparing the insulating layer having a porous structure using a material such as general-purpose polypropylene resin (PP resin) and polyethylene resin (PE resin). The insulating layer made of a material (e.g., PP resin and PE resin) that melts at high temperatures is easy to exhibit the shutdown function, however, the insulating layer is difficult to maintain its shape at higher temperatures and is likely to cause short circuits. Therefore, there is a demand for an insulating layer that can exhibit the shutdown function while maintaining its shape even at higher temperatures. That is, there is a demand for an insulating layer capable of achieving both a shape maintaining function and a shutdown function. The porous structure of the present embodiment can respond to this demand by imparting a shape maintaining function to the porous structure portion A and imparting a shutdown function to the porous structure portion B. In the porous structure of the present embodiment, the porous structure portion A and the porous structure portion B are continuously integrated without forming an interface therebetween. Therefore, the occurrence of peeling is suppressed to improve the strength, and a decrease in pore communicability is suppressed to improve ion permeability. The functions that can be provided by the porous structure used as an insulating layer are not limited to the shape maintaining function and the shutdown function, and can be two or more functions that can be imparted to the porous structure portion A and the porous structure portion B.

A porous structure portion having the above-described shape maintaining function may be formed of a resin having high hardness or scratch resistance. Such a porous structure portion formed of the resin having high hardness or scratch resistance can be prepared by, for example, increasing the proportion of polymerizable compounds in the liquid composition.

Next, a case where the porous structure portion A is imparted with the shape maintaining function and the porous structure portion B is imparted with the shutdown function in the porous structure of the present embodiment is described in detail with reference to FIG. 5.

Figure 5:
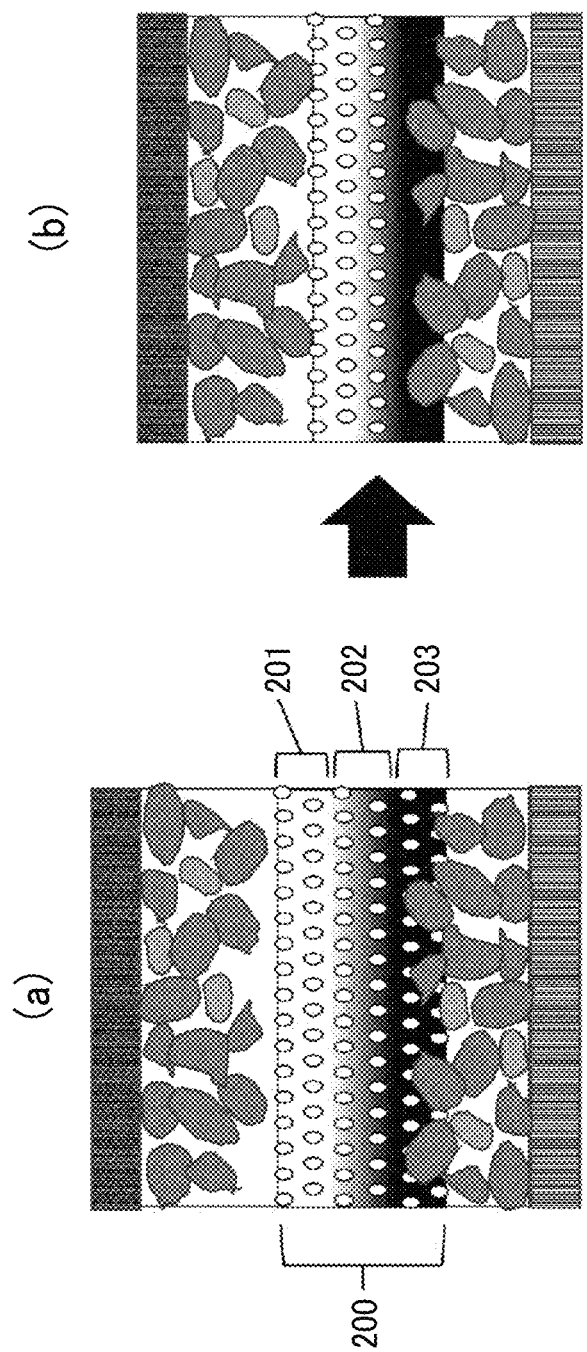
FIG. 5 is a schematic diagram for explaining a shape maintaining function and a shutdown function of a porous structure according to an embodiment of the present invention used as an insulating layer.

FIG. 5 is a schematic diagram for explaining a shape maintaining function and a shutdown function of the porous structure of the present embodiment used as an insulating layer, A porous structure 200 illustrated in FIG. 5, stage a, includes a porous structure portion 201 (porous structure portion A), an intermediate layer 202, and a porous structure portion 203 (porous structure portion B). The porous structure portion 201 (porous structure portion A) has a shape maintaining function, and the porous structure portion 203 (porous structure portion B) has a shutdown function.

In a power storage element including such a porous structure, when an excessive current flows due to abnormal charging/discharging or the like and the power storage element generates abnormal heat, the porous structure portion 203 (porous structure portion B) having the shutdown function contracts in the layer thickness direction, and the pores inside the porous structure portion 203 (porous structure portion B) thereby get closed, as illustrated in FIG. 5, stage b. As a result, ions in the electrolytic solution are inhibited from moving in the porous structure, and an electrochemical reaction in the power storage element is suppressed from proceeding. Thus, the current flow is interrupted, and a temperature rise is suppressed.

On the other hand, when the surrounding environment of the power storage element comes to have a high temperature and the internal temperature of the power storage element thereby becomes 160 degrees C. or higher, an SEI film gets decomposed, so that an electrochemical reaction between the negative electrode and the electrolytic solution proceeds. After that, when the internal temperature of the power storage element reaches 180 degrees C. or higher, an electrochemical reaction between the positive electrode and the electrolytic solution proceeds. When a thermal runaway reaction based on such an electrochemical reaction proceeds, the internal temperature of the power storage element rapidly rises to 200 degrees C. or higher. However, as the porous structure portion 201 (porous structure portion A) has the shape maintaining function, the porous structure portion 201 (porous structure portion A) maintains the shape without contracting in the layer thickness direction even in a high temperature environment. This makes it possible to suppress a short circuit between the positive electrode and the negative electrode.

As described above, when the porous structure portion A is imparted with the shape maintaining function, it is preferable that the glass transition temperature or melting point of the resin A constituting the porous structure portion A be high. Specifically, the glass transition temperature or melting point of the resin A is preferably 160 degrees C. or higher, more preferably 180 degrees C. or higher, and even more preferably 200 degrees C. or higher.

On the other hand, when the porous structure portion B is imparted with the shutdown function, it is preferable that the glass transition temperature or melting point of the resin B constituting the porous structure portion B be low. Specifically, the glass transition temperature or melting point of the resin B is preferably lower than 160 degrees C., more preferably 100 degrees C. or lower, even more preferably 50 degrees C. or lower, and particularly preferably 30 degrees C. or lower.

Next, the relation between the glass transition temperature or melting point of the resin A and the glass transition temperature or melting point of the resin B when the porous structure portion A is given the shape maintaining function and the porous structure portion B is given the shutdown function is described.

As described above, when an excessive current flows due to abnormal charging/discharging or the like and the power storage element generates abnormal heat, the porous structure portion 203 (porous structure portion B) having the shutdown function contracts in the layer thickness direction, and the pores inside the porous structure portion 203 (porous structure portion B) thereby get closed. As a result, ions in the electrolytic solution are inhibited from moving in the porous structure, and an electrochemical reaction in the power storage element is suppressed from proceeding. Thus, the current flow is interrupted, and a temperature rise is suppressed. However, even after the porous structure portion 203 (porous structure portion B) has contracted in the layer thickness direction, the internal temperature of the power storage element gradually rises for a certain period of time. Therefore, it is preferable that the porous structure portion A exert the shape maintaining function in the period of temperature rise after the current flow has been cut off to prevent a short circuit between the positive electrode and the negative electrode. To achieve this, the glass transition temperature or melting point of the resin A is preferably higher than the glass transition temperature or melting point of the resin B, more preferably higher by 20 degrees C., much more preferably higher by 50 degrees C., and particularly preferably higher by 100 degrees C.

Next, configurations of members of the power storage element and the power generation element, other than the insulating layer, are described. In addition to the insulating layer, the power storage element and the power generation element include an electrode substrate and an electrode mixture part. The electrode mixture part contains an active material.

The electrode substrate is not particularly limited as long as it is a conductive substrate. Specific examples thereof include, but are not limited to, aluminum foils, copper foils, stainless steel foils, titanium foils, etched foils having fine holes made by etching the above foils, and perforated electrode substrates used for lithium ion capacitors. Such an electrode substrate can be suitably used for secondary batteries and capacitors, which are typical power storage elements, and particularly suitably used for lithium ion secondary batteries.

Another example of the electrode substrate includes a fibrous electrode (such as carbon paper) flattened in a non-woven or woven form and the above-described perforated electrode substrate which has fine holes. Such electrode substrates can be suitably used for power generation elements such as fuel cells.

Another example of the electrode substrate further includes a transparent semiconductor thin film (such as indium-titanium oxide and zinc oxide) formed on a flat substrate (such as glass and plastic substrates) and a conductive electrode film thinly vapor-deposited on the flat substrate. Such electrode substrates can be suitably used for power generation elements such as solar cells.

The active material is contained in the electrode mixture part (also referred to as the p "active material layer"). The active material layer is formed by dispersing a powdered active material or a catalyst composition in a liquid, applying the liquid onto the electrode substrate, and fixing and drying the liquid. The applying is generally performed using a spray, a dispenser, a die coater, a pull-up coating, or the like.

The positive electrode active material is not particularly limited as long as it is a material capable of reversibly occluding and releasing alkali metal ions. Typically, alkali-metal-containing transition metal compounds may be used as the positive electrode active material. Examples of lithium-containing transition metal compounds include, but are not limited to, composite oxides comprising lithium and at least one element selected from the group consisting of cobalt, manganese, nickel, chromium, iron, and vanadium. Specific examples of such composite oxides include, but are not limited to, lithium-containing transition metal oxides such as lithium cobalt oxide, lithium nickel oxide, and lithium manganese oxide; olivine-type lithium salts such as $LiFePO_4$; chalcogen compounds such as titanium disulfide and molybdenum disulfide; and manganese dioxide. The lithium-containing transition metal oxides refer to metal oxides containing lithium and a transition metal or those in which a part of the transition metal is substituted with a different element. Examples of the different element include, but are not limited to, Na, Mg, Sc, Y, Mn, Fe, Co, Ni, Cu, Zn, Al, Cr, Pb, Sb, and B. Among these, Mn, Al, Co, Ni, and Mg are preferred. One type of different element or two or more types of different elements may be contained in the compound. Each of the above-described positive electrode active materials can be used alone or in combination with others. Examples of the active material for nickel metal hydride batteries include, but are not limited to, nickel hydroxide.

The negative electrode active material is not particularly limited as long as it is a material capable of reversibly occluding and releasing alkali metal ions. Typically, carbon materials including graphite having a graphite-type crystal structure may be used as the negative electrode active material. Examples of such carbon materials include, but are not limited to, natural graphite, spherical or fibrous synthetic graphite, poorly-graphitizable carbon (hard carbon), and easily-graphitizable carbon (soft carbon). Other than the carbon materials, lithium titanate may also be used. For improving energy density of lithium ion batteries, high capacity materials such as silicon, tin, silicon alloy, tin alloy, silicon oxide, silicon nitride, and tin oxide can also be suitably used as the negative electrode active material.

Examples of the active material in nickel metal hydride batteries include, but are not limited to, AB2-type and A2B-type hydrogen storage alloys.

Specific examples of the binder of the negative electrode and positive electrode include, but are not limited to, PVDF (polyvinylidene fluoride), PTFE (polytetrafluoroethylene), polyethylene, polypropylene, aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinyl pyrrolidone, polyether, polyether sulfone, hexafluoropolypropylene, styrene butadiene rubber, and carboxymethyl cellulose. Specific examples of the binder further include copolymers of two or more materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. In addition, mixtures of two or more materials selected from these materials may also be used. Examples of conducting agents contained in the electrode include, but are not limited to: graphites such as natural graphite and synthetic graphite; carbon blacks such as acetylene black, Ketjen black, channel black, furnace black, lamp black, and thermal black; conductive fibers such as carbon fibers and metal fibers; carbon fluoride; powders of metals such as aluminum; conductive whiskers such as zinc oxide and potassium titanate; conductive metal oxides such as titanium oxide; and organic conductive materials such as phenylene derivatives and graphene derivatives.

Generally, in fuel cells, the active material serves as a catalyst for the cathode electrode or the anode electrode. The catalyst comprises catalyst particles (e.g., fine particles of a metal such as platinum, ruthenium, and platinum alloy) supported on a catalyst carrier (e.g., carbon). The catalyst particles can be made supported on the surface of the catalyst carrier by suspending the catalyst carrier in water, then adding precursors of the catalyst particles thereto to make them dissolved in the suspension, and further adding an alkali to produce a hydroxide of the metal. Here, specific examples of the precursors of the catalyst particles include, but are not limited to, chloroplatinic acid, dinitrodiamino platinum, platinum(IV) chloride, platinum(II) chloride, bisacetylacetonatoplatinum, dichlorodiammine platinum, dichlorotetramine platinum, platinum sulfate chlororuthenate, hexachloroiridate, hexachlororhodate, ferric chloride, cobalt chloride, chromium chloride, gold chloride, silver nitrate, rhodium nitrate, palladium chloride, nickel nitrate, iron sulfate, and copper chloride. The catalyst carrier is then applied onto the electrode substrate and reduced under a hydrogen atmosphere or the like, thus preparing an electrode having a surface coated with the catalyst particles (active material).

In solar cells, the active material may be tungsten oxide powder, titanium oxide powder, or a semiconductor layer of an oxide (e.g., $SnO_2$, $ZnO$, $ZrO_2$, $Nb_2O_5$, $CeO_2$, $SiO_2$, and $Al_2O_3$) carrying a dye (e.g., ruthenium-tris transition metal complex, ruthenium-bis transition metal complex, osmium-tris transition metal complex, osmium-bis transition metal complex, ruthenium-cis-diaqua-bipyridyl complex, phthalocyanine and porphyrin, and organic-inorganic perovskite crystal).

Next, the electrolytic solution to fill the power storage element is described. The electrolytic solution is a liquid containing a solvent and an electrolyte.

Specific examples of the solvent include, but are not limited to, propylene carbonate, ethyl methyl carbonate, dimethyl carbonate, ethylene carbonate, acetonitrile, γ-butyrolactone, sulfolane, dioxolane, tetrahydrofuran, 2-methyltetrahydrofuran, dimethylsulfoxide, 1,2-dimethoxyethane, 1,2-ethoxymethoxyethane, polyethylene glycol, alcohols, and mixtures thereof.

Examples of the electrolyte include solid electrolytes soluble in solvents and liquid electrolytes such as ionic liquids.

The solid electrolytes are not particularly limited as long as they are soluble in solvents. Examples thereof include, but are not limited to, inorganic ion salts such as alkali metal salts and alkali-earth metal salts; quaternary ammonium salts; and supporting salts of acids and bases. Specific examples thereof include, but are not limited to, $LiClO_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$, and $Mg(BF_4)_2$.

Examples of the liquid electrolyte include various ionic liquids containing a cation component and an anion component. The ionic liquids are preferably those capable of maintaining in a liquid state in a wide temperature range including room temperature. Specific examples of the cationic component include, but are not limited to, imidazole derivatives (e.g., N,N-dimethylimidazole salt, N,N-methylethylimidazole salt, N,N-methylpropylimidazole salt), aromatic salts of pyridinium derivatives (e.g., N,N-dimethylpyridinium salt, N,N-methylpropylpyridinium salt), and aliphatic quaternary ammonium compounds such as tetraalkylammonium compounds (e.g., trimethylpropylammonium salt, trimethylhexylammonium salt, triethylhexylammonium salt). For stability in the atmosphere, specific preferred examples of the anionic component include, but are not limited to, fluorine-containing compounds such as $BF_4^-$, $CF_3SO_3^-$, $PF_4^-$, $(CF_3SO_2)_2N^-$, and $B(CN_4)^-$.

The amount of the electrolyte in the electrolytic solution is not particularly limited and can be suitably selected to suit to a particular application, but is preferably from 0.7 to 4.0 mol/L, more preferably from 1.0 to 3.0 mol/L, and particularly preferably from 1.0 to 2.5 mol/L for achieving a good balance between the capacity and the output of the power storage element.

Application for Carrier

The porous structure of the present embodiment can be used as a carrier that supports a functional substance on the surface of the porous structure portion. Here, the surface of the porous structure portion includes not only the outer surface of the porous structure portion but also the inner surface thereof that communicates with the outside. Since the pores communicating with the outside can carry the functional substance, the area of the surface capable of supporting the functional substance is increased.

In the porous structure of the present embodiment, the porous structure portion A and the porous structure portion B are continuously integrated without forming an interface therebetween. Therefore, the occurrence of peeling is suppressed to improve the strength and a decrease in pore communicability is suppressed, providing a carrier carrying a functional substance in the pores communicating with the outside.

In the carrier of the present embodiment, the porous structure portion A and the porous structure portion B are formed of resins composed of different constituents. Such a carrier can be designed more freely in terms of performance compared to a carrier composed of a single porous structure portion. When the difference in constituents of the resins forming the porous structure portion A and the porous structure portion B is caused by the difference in the type and/or number of functional groups contained in the polymerizable compounds contained in the liquid compositions used for synthesizing these resins, the type and/or number of functional groups contained in the porous structure portion A and the porous structure portion B are thereby different. Thus, the porous structure portion A and the porous structure portion B are capable of controlling the functions exerted by the functional substances based on the interaction between the functional groups contained in the respective porous structure portions and the functional substances carried by the respective porous structure portions. For example, even when the porous structure portion A and the porous structure portion B carry the same or similar functional substances, it is possible to make a difference in the amount of functions of the functional substance exhibited inside the porous structure portion and a difference in the release speed for releasing the functional substance from the inside of the porous structure portion to the outside of the porous structure portion, based on the difference in the type and number of functional groups contained in each of the porous structure portions.

When the difference in constituents of the resins forming the porous structure portion A and the porous structure portion B is caused by the type and amount (concentration) of the polymerization initiators contained in the liquid compositions used for synthesizing these resins, the polymerization rates are made different. As a result, the sizes of the pores in the porous structure portion A and the porous structure portion B are made different. By utilizing this, a carrier can be provided in which the porous structure portion A and the porous structure portion B each having pores with the size adjusted according to the amount of functions of the target functional substance and the release speed for releasing the functional substance.

The carrier of the present embodiment may be manufactured by forming a porous structure portion with adding a functional substance only to the liquid composition A. Thus, a carrier in which only the porous structure portion A carries the functional substance and the porous structure portion B carries no functional substance can be produced. Similarly, a carrier in which only the porous structure portion B carries the functional substance and the porous structure portion A carries no functional substance can be produced. Such a carrier can be designed more freely in terms of performance.

The functional substance is a substance that directly or indirectly exerts a predetermined function. Preferably, the functional substance is a substance whose function is increased or improved, when supported on the porous structure, as the area on the porous structure supporting the functional substance increases. More preferably, the functional substance is a substance whose function is exerted when located on the outer surface and/or the inner surface portion which communicates with the outside (in other words, a substance whose function is suppressed when located on the inner surface portion which does not communicate with the outside). The functional substance is not particularly limited. Examples thereof include, but are not limited to, photocatalysts and physiologically active substances.

The photocatalyst is a substance that exhibits photocatalytic activity when irradiated with light in a specific wavelength range (i.e., excitation light having energy equal to or greater than the band gap between the valence band and the conduction band of the photocatalyst). The photocatalyst exhibits photocatalytic activity to exert various actions such as antibacterial action, deodorant action, and harmful substance (e.g., volatile organic compound (VOC)) decomposition action.

Specific examples of the photocatalyst include, but are not limited to: metal oxides such as anatase-type or rutile-type titanium(IV) oxide ($TiO_2$), tungsten(III) oxide ($W_2O_3$), tungsten(IV) oxide ($WO_2$), tungsten(VI) oxide ($WO_3$), zinc oxide (ZnO), iron(III) oxide ($Fe_2O_3$), strontium titanate ($SrTiO_3$), bismuth(III) oxide ($Bi_2O_3$), bismuth vanadate ($BiVO_4$), tin(II) oxide (SnO), tin(IV) oxide ($SnO_2$), tin(VI) oxide ($SnO_3$), zirconium oxide ($ZrO_2$), cerium(II) oxide (CeO), cerium(IV) oxide ($CeO_2$), barium titanate ($BaTiO_3$), indium(III) oxide ($In_2O_3$), copper(I) oxide ($Cu_2O$), copper (II) oxide (CuO), potassium tantalate ($KTaO_3$), and potassium niobate ($KNbO_3$); metal sulfides such as cadmium sulfide (CdS), zinc sulfide (ZnS), and indium sulfide (InS); metal selenides such as cadmium selenate ($CdSeO_4$) and zinc selenide (ZnSe); and metal nitrides such as gallium nitride (GaN). Preferably, at least one selected from titanium (IV) oxide ($TiO_2$), tin(IV) oxide ($SnO_2$), tungsten(III) oxide ($W_2O_3$), tungsten(IV) oxide ($WO_2$), and tungsten(VI) oxide ($WO_3$) is included. More preferably, anatase-type titanium (IV) oxide ($TiO_2$) is included.

Physiologically active substances are active ingredients that contribute to the development of physiological effects. Specific examples thereof include, but are not limited to, low-molecular-weight compounds used in low-molecular-weight drugs, foods, and cosmetics, proteins such as antibodies and enzymes used in biopharmacy, and high-molecular-compounds such as nucleic acids such as DNA and RNA. The "physiological effect" is an effect caused by the action of a physiologically active substance at a target site, such as a quantitative and/or qualitative change or impact in living bodies, tissues, cells, proteins, DNA, RNA, or the like. Further, "the physiologically active substance acts at the target site" means, for example, that "the physiologically active substance changes or affects the target tissue or the like". Preferably, the target site is a protein constituting a receptor present on the surface or inside a cell. In this case, the physiologically active substance binds to a protein having a specific higher-order structure to cause intracellular signal transduction, and as a result, a physiological effect is exhibited. The physiologically active substance may be a substance that is denatured into an active form by an enzyme in a living body and then binds to a specific binding site to contribute to a physiological effect. In this case, in the present disclosure, the substance before denatured into the active form is also included in the meaning of the physiologically active substance. The physiologically active substance may be either a substance produced by an organism (human being or a non-human organism) or an artificially synthesized substance.

Application for Separation Layer or Reaction Layer

In a case where the porous structure of the present embodiment allows fluids (e.g., liquids and gases) to permeate, the porous structure can be used as a flow path for fluids. When the porous structure can be used as a flow path for a fluid, the porous structure can be used as a separation layer that separates a predetermined substance from the fluid or a reaction layer (microreactor) that provides a minute reaction field for the fluid. It is preferable that the porous structure used for these applications allow fluids to permeate uniformly and efficiently inside the porous structure. In this respect, the porous structure of the present embodiment has pores communicating with each other, which allows fluids to permeate uniformly and efficiently.

The case where the porous structure allows fluids (e.g., liquids and gases) to permeate is not particularly limited, but is preferably a case where the air permeability measured in accordance with JIS P8117 is 500 seconds/100 mL or less, preferably 300 seconds/100 mL or less. In this case, the air permeability can be measured using a Gurley densometer (manufactured by Toyo Seiki Seisaku-sho, Ltd.).

Here, the "separation" refers to removal or condensation of a predetermined substance contained in a mixture as a fluid. The "removal" is not limited to the case where the predetermined substance is completely removed from the mixture as a fluid and may be the case where a part thereof is removed.

The reaction field refers to a place where a predetermined chemical reaction proceeds when a predetermined substance contained in the fluid passes through.

In the present disclosure, the separation layer and the reaction layer are not limited to those having a layer-like shape and may be in another shape.

In the separation layer and the reaction layer of the present embodiment, the porous structure portion A and the porous structure portion B are continuously integrated without forming an interface therebetween. Therefore, the occurrence of peeling is suppressed to improve the strength of the separation layer and the reaction layer and a decrease in pore communicability is suppressed, and the separation layer and the reaction layer allow fluids to uniformly and efficiently permeate.

When used for a separation layer, the porous structure of the present embodiment preferably has a functional group capable of interacting with a predetermined substance contained in the fluid. Specifically, when the functional group capable of interacting with the predetermined substance is arranged on the surface (inner surface and outer surface) of the porous structure portion, the predetermined substance can be effectively separated.

In the separation layer of the present embodiment, the porous structure portion A and the porous structure portion B are formed of resins composed of different constituents. Such a separation layer can be designed more freely in terms of performance compared to a separation layer composed of a single porous structure portion. When the difference in constituents of the resins forming the porous structure portion A and the porous structure portion B is caused by the difference in the type of functional groups contained in the polymerizable compounds contained in the liquid compositions used for synthesizing these resins, the type of functional groups contained in the porous structure portion A and the porous structure portion B are thereby different. Thus, in the separation layer, the porous structure portion A and the porous structure portion B are capable of separating different types of substances.

When the difference in constituents of the resins forming the porous structure portion A and the porous structure portion B is caused by the type and amount (concentration) of the polymerization initiators contained in the liquid compositions used for synthesizing these resins, the polymerization rates are made different. As a result, the sizes of the pores in the porous structure portion A and the porous structure portion B are made different. By utilizing this, a separation layer can be provided in which the porous structure portion A and the porous structure portion B each having pores with the size adjusted according to the type of functional group for appropriately separating substances.

When used for a reaction layer, the porous structure of the present embodiment preferably has a functional group that provides a reaction field for the fluid. Specifically, the functional group that provides a reaction field for the fluid is arranged on the surface (inner surface and outer surface) of the porous structure portion to effectively provide the reaction field.

In the reaction layer of the present embodiment, the porous structure portion A and the porous structure portion B are formed of resins composed of different constituents. Such a reaction layer can be designed more freely in terms of performance compared to a reaction layer composed of a single porous structure portion. When the difference in constituents of the resins forming the porous structure portion A and the porous structure portion B is caused by the difference in the type of functional groups contained in the polymerizable compounds contained in the liquid compositions used for synthesizing these resins, the type of functional groups contained in the porous structure portion A and the porous structure portion B are thereby different. Thus, in the reaction layer, the porous structure portion A and the porous structure portion B are capable of promoting different types of reactions.

When the difference in constituents of the resins forming the porous structure portion A and the porous structure portion B is caused by the type and amount (concentration) of the polymerization initiators contained in the liquid compositions used for synthesizing these resins, the polymerization rates are made different. As a result, the sizes of the pores in the porous structure portion A and the porous structure portion B are made different. By utilizing this, a reaction layer can be provided in which the porous structure portion A and the porous structure portion B each having pores with the size adjusted according to the type of functional group for promoting the reactions.

The separation layer and the reaction layer may be formed by filling a container capable of forming a fluid inflow portion and a fluid outflow portion (such as a glass tube) with the liquid composition and curing the liquid composition. The separation layer and the reaction layer may also be formed by printing (drawing) with the liquid composition a flow path of a desired shape formed of the porous structure on a substrate by an inkjet method or the like. Since the separation layer and the reaction layer can be provided by printing, it is possible to provide a flow path according to any application.

EXAMPLES

Further understanding of the present disclosure can be obtained by reference to certain specific examples provided herein below for the purpose of illustration only and are not intended to be limiting.

Liquid Composition Preparation Examples

Liquid compositions were prepared by mixing materials in the proportions shown below. In preparation of the porous structure to be described later, the liquid composition applied first was serving as a pre-coating liquid, and the liquid composition applied later was serving as a post-coating liquid.

Preparation Example of Pre-Coating Liquid E1

Tricyclodecane dimethanol diacrylate (manufactured by DAICEL-ALLNEX LTD.). 29.0% by mass
Dipropylene glycol monomethyl ether (manufactured by Kanto Chemical Co., Inc.): 70.0% by mass
IRGACURE 184 (manufactured by BASF): 1.0% by mass Preparation Example of Post-Coating Liquid E1

Tris(2-hydroxyethyl) isocyanurate triacrylate (manufactured by Arkema (Sartomer)): 29.0% by mass
Dipropylene glycol monomethyl ether (manufactured by Kanto Chemical Co., Inc.): 70.0% by mass
IRGACURE 184 (manufactured by BASF): 1.0% by mass Preparation Examples of Pre-Coating Liquids E2 to E16 and Pre-Coating Liquids C1 to C8

Pre-coating liquids E2 to E16 and pre-coating liquids C1 to 8 were prepared in the same manner as the pre-coating liquid E1 except for changing the composition according to the description in Tables 1 to 3. The unit for each numerical value for indicating the composition in Tables 1 to 3 is "% by mass".

Preparation Examples of Post-Coating Liquids E2 to E16 and Post-Coating Liquids C1 to C8

Post-coating liquids E2 to E16 and post-coating liquids C1 to 8 were prepared in the same manner as the post-coating liquid E1 except for changing the composition according to the description in Tables 1 to 3. The unit for each numerical value for indicating the composition in Tables 1 to 3 is "% by mass".

The viscosity at 25 degrees C. of each of the pre-coating liquids E1 to E16, the pre-coating liquids C1 to 8, the post-coating liquids E1 to E16, and the post-coating liquids C1 to 8 was measured using a viscometer (RE-550L manufactured by Toki Sangyo Co., Ltd.) and evaluated according to the following evaluation criteria. Results are presented in Tables 1 to 3.

Evaluation Criteria
a: The viscosity of the liquid composition is 30.0 mPa·s or less.
b: The viscosity of the liquid composition is greater than 30.0 mPa·s.

In Tables 1 to 3, the trade names and manufacturers of the following materials are as follows.
EBECRYL 4101 (manufactured by DAICEL-ALLNEX LTD.)
EBECRYL 4201 (manufactured by DAICEL-ALLNEX LTD.)
IRGACURE TPO (manufactured by BASF)

Porous Structure Preparation Examples Example 1

The pre-coating liquid E1 and the post-coating liquid E1 were installed in an inkjet discharge device equipped with a GENS head (product of Ricoh Printing Systems, Ltd.). The pre-coating liquid E1 was discharged onto a glass substrate to form a solid image-like coating region. Immediately after that, the post-coating liquid E1 was discharged to form a solid image-like coating region so as to overlap the coating region on the glass substrate. Immediately after that, in an $N_2$ atmosphere, the coating regions of the pre-coating liquid E1 and the post-coating liquid E1 were irradiated with UV (light source: UV-LED (FJ800 manufactured by Phoseon Technology), wavelength: 365 nm, irradiation intensity: 30 mW/cm$^2$, irradiation time: 20 s) to be cured at the same time. Next, the cured product was heated at 120 degrees C. for 1 minute using a hot plate to remove the porogen, thus obtaining a porous structure.

Examples 2 to 4 and 15 to 16

The procedure in Example 1 was repeated except for replacing the pre-coating liquid E1 and the post-coating liquid E1 with the pre-coating liquid and the post-coating liquid described in Table 1, thus obtaining porous structures of Examples 2 to 4 and 15 to 16.

Comparative Example 1

The pre-coating liquid C1 and the post-coating liquid C1 were installed in an inkjet discharge device equipped with a GENS head (product of Ricoh Printing Systems, Ltd.). The pre-coating liquid C1 was discharged onto a glass substrate to form a solid image-like coating region. Immediately after that, in an N₂ atmosphere, the coating region of the pre-coating liquid C1 was irradiated with UV (light source: UV-LED (FJ800 manufactured by Phoseon Technology), wavelength: 365 nm, irradiation intensity: 30 mW/cm², irradiation time: 20 s) to be cured. Next, the post-coating liquid C1 was discharged to form a solid image-like coating region so as to overlap the cured region on the glass substrate. Immediately after that, in an N₂ atmosphere, the coating region of the post-coating liquid C1 was irradiated with UV (light source: UV-LED (FJ800 manufactured by Phoseon Technology), wavelength: 365 nm, irradiation intensity: 30 mW/cm², irradiation time: 20 s) to be cured. Next, the cured product was heated at 120 degrees C. for 1 minute using a hot plate to remove the porogen, thus obtaining a porous structure.

Comparative Examples 2 to 4

The procedure in Comparative Example 1 was repeated except for replacing the pre-coating liquid C1 and the post-coating liquid C1 with the pre-coating liquid and the post-coating liquid described in Table 1, thus obtaining porous structures of Comparative Examples 2 to 4.

The porous structures obtained in Examples 1 to 4 and 15 to 16 and Comparative Examples 1 to 4 were subjected to evaluations of the pore size, presence or absence of an interface, porosity, strength, and communicability.

Evaluation of Pore Size

A cross-section of the porous structure was prepared and observed with SEM. As a result, in all of the porous structures of Examples 1 to 4 and 15 to 16 and Comparative Examples 1 to 4, pores having a size of about 0.1 to 1.0 µm were observed over the entire porous structure. The pores in the cured region of the pre-coating liquid were communicated with each other, and the pores in the cured region of the post-coating liquid were also communicated with each other.

Evaluation of Presence or Absence of Interface

A cross-section of the porous structure was prepared and observed with SEM to confirm the presence or absence of an interface between the cured region of the pre-coating liquid and the cured region of the post-coating liquid. The results are presented in Table 1 according to the following evaluation criteria.

Evaluation Criteria
a: No interface is observed.
b: An interface is observed.

Evaluation of Porosity

The porous structure was filled with an unsaturated fatty acid (e.g., commercially available butter) and stained with osmium, then an internal cross-sectional structure was cut out using an FIB and observed with SEM to measure the porosity. The porosity was measured in each of the cured region of the pre-coating liquid and the cured region of the post-coating liquid. The results of porosity are presented in Table 1 according to the following evaluation criteria.

Evaluation Criteria
a: Porosity is 30% or more.
b: Porosity is less than 30%.

Evaluation of Strength

A test was conducted in which an adhesive tape was attached to the surface of the porous structure and then peeled off After that, a cross-section of the porous structure was prepared, and the position of the surface peeled in this test was observed with SEM. The results are presented in Table 1 according to the following evaluation criteria.

Evaluation Criteria
a: No peeling has occurred, or peeling has occurred at a position other than a region (including the interface) between the cured region of the pre-coating liquid and the cured region of the post-coating liquid.
b: Peeling has occurred at a region (including the interface) between the cured region of the pre-coating liquid and the cured region of the post-coating liquid.

Evaluation of Communicability

A cross-section of the porous structure was prepared and observed with SEM to confirm pore communicability between the cured region of the pre-coating liquid and the cured region of the post-coating liquid. The results are presented in Table 1 according to the following evaluation criteria.

Evaluation Criteria
a: The pores between the cured region of the pre-coating liquid and the cured region of the post-coating liquid are continuously connected.
b: The pores between the cured region of the pre-coating liquid and the cured region of the post-coating liquid are not continuously connected.

Negative Electrode Preparation Example

A negative electrode active material dispersion was prepared by uniformly dispersing in water 97.0 parts by mass of graphite particles (having an average particle diameter of 10 µm) as a negative electrode active material, 1.0 part by mass of cellulose as a thickener, and 2.0 parts by mass of an acrylic resin as a binder. This dispersion was applied onto a copper foil having a thickness of 8 µm, serving as a negative electrode substrate, and the resulted coating film was dried at 120 degrees C. for 10 minutes and pressed, thus forming an electrode mixture part having a thickness of 60 µm. The electrode mixture part was cut out to a piece of 50 mm×33 mm to prepare a negative electrode.

Positive Electrode Preparation Example

A positive electrode active material dispersion was prepared by uniformly dispersing in N-methylpyrrolidone as a solvent 94.0 parts by mass of mixed particles of nickel, cobalt, and aluminum as positive electrode active materials, 3.0 parts by mass of Ketjen black as a conductive auxiliary agent, and 3.0 parts by mass of a polyvinylidene fluoride resin as a binder. This dispersion was applied onto an aluminum foil having a thickness of 15 µm, serving as an electrode substrate, and the resulted coating film was dried at 120 degrees C. for 10 minutes and pressed, thus forming an electrode mixture part having a thickness of 50 µm. The electrode mixture part was cut out to a piece of 43 mm×29 mm to prepare a positive electrode.

Preparation Examples of Porous Structures, Electrodes, and Power Storage Elements Example 5

The pre-coating liquid E5 and the post-coating liquid E5 were installed in an inkjet discharge device equipped with a GENS head (product of Ricoh Printing Systems, Ltd.). The pre-coating liquid E5 was discharged onto the above-prepared negative electrode to form a solid image-like coating region. Immediately after that, the post-coating liquid E5 was discharged to form a solid image-like coating region so as to overlap the coating region on the negative electrode. Immediately after that, in an N₂ atmosphere, the coating regions of the pre-coating liquid E5 and the post-coating liquid E5 were irradiated with UV (light source: UV-LED (FJ800 manufactured by Phoseon Technology), wavelength: 365 nm, irradiation intensity: 30 mW/cm², irradiation time: 20 s) to be cured at the same time. Next, the cured product was heated at 120 degrees C. for 1 minute using a hot plate to remove the porogen, thus obtaining the negative electrode integrated with a porous structure.

Next, the negative electrode integrated with the porous structure and the above-prepared positive electrode were made to oppose to each other, followed by injection of an electrolytic solution and sealing with a laminated exterior material. Thus, a power storage element was prepared. The electrolytic solution used was a 1.5 mol/L solution of $LiPF_6$ as an electrolyte in a mixture of ethylene carbonate (EC) and dimethyl carbonate (DMC) (mass ratio EC:DMC=1:1).

Examples 6 to 14

The procedure in Example 5 was repeated except for replacing the pre-coating liquid E5 and the post-coating liquid E5 with the pre-coating liquid and the post-coating liquid described in Tables 2 to 3, thus obtaining power storage elements of Examples 6 to 14.

Comparative Example 5

The pre-coating liquid C5 was installed in an inkjet discharge device equipped with a GENS head (product of Ricoh Printing Systems, Ltd.). The pre-coating liquid C5 was discharged onto the above-prepared negative electrode to form a solid image-like coating region. Immediately after that, in an $N_2$ atmosphere, the coating region of the pre-coating liquid C5 was irradiated with UV (light source: UV-LED (FJ800 manufactured by Phoseon Technology), wavelength: 365 nm, irradiation intensity: 30 mW/cm², irradiation time: 20 s) to be cured. Next, the cured product was heated at 120 degrees C. for 1 minute using a hot plate to remove the porogen, thus obtaining the negative electrode integrated with a porous structure.

Next, the negative electrode integrated with the porous structure and the above-prepared positive electrode were made to oppose to each other, followed by injection of an electrolytic solution and sealing with a laminated exterior material. Thus, a power storage element was prepared. The electrolytic solution used was a 1.5 mol/L solution of $LiPF_6$ as an electrolyte in a mixture of ethylene carbonate (EC) and dimethyl carbonate (DMC) (mass ratio EC:DMC=1:1).

Comparative Examples 6 to 8

The procedure in Comparative Example 5 was repeated except for replacing the pre-coating liquid C5 with the pre-coating liquid described in Table 3, thus obtaining power storage elements of Comparative Examples 6 to 8.

Comparative Example 9

A microporous film made of polypropylene resin having a thickness of 25 μm was arranged as an insulating layer on the above-prepared negative electrode, thus obtaining the negative electrode having an insulating layer thereon.

Next, the negative electrode having an insulating layer thereon and the above-prepared positive electrode were made to oppose to each other, followed by injection of an electrolytic solution and sealing with a laminated exterior material. Thus, a power storage element was prepared. The electrolytic solution used was a 1.5 mol/L solution of $LiPF_6$ as an electrolyte in a mixture of ethylene carbonate (EC) and dimethyl carbonate (DMC) (mass ratio EC:DMC=1:1).

Next, the porous structures in the power storage elements obtained in Examples 5 to 14 and Comparative Examples 5 to 9 were subjected to measurements of the glass transition temperature or melting point in the cured region of the pre-coating liquid and the glass transition temperature of melting point in the cured region of the post-coating liquid were measured using a differential scanning calorimeter (DSC). In examples where the post-coating liquid was not used, the glass transition temperature or melting point in the cured region of the post-coating liquid was not measured, so the result was indicated as "-" in Table 3. In Comparative Example 9, the glass transition temperature or melting point of the microporous film made of polypropylene resin was measured. The glass transition temperature and melting point were measured using a differential scanning calorimeter (DSC). The results are presented in Tables 2 to 3.

The power storage elements obtained in Examples 5 to 14 and Comparative Examples 5 to 9 were subjected to evaluations of the pore size, presence or absence of an interface, porosity, strength, communicability, insulation at high temperature, and impedance.

Evaluation of Pore Size

A cross-section of the porous structure was prepared and observed with SEM. As a result, in all of the porous structures in the power storage elements of Examples 5 to 14 and Comparative Examples 5 to 9, pores having a size of about 0.1 to 1.0 μm were observed over the entire porous structure. The pores in the cured region of the pre-coating liquid were communicated with each other, and the pores in the cured region of the post-coating liquid were also communicated with each other.

Evaluation of Presence or Absence of Interface

A cross-section of the porous structure was prepared and observed with SEM to confirm the presence or absence of an interface between the cured region of the pre-coating liquid and the cured region of the post-coating liquid. The results are presented in Tables 2 to 3 according to the following evaluation criteria. In Comparative Examples 5 to 8 in which the post-coating liquid was not used, the observation was not measured, so the result was indicated as "-" in Table 3. In Comparative Example 9 in which the insulating layer was not formed using a pre-coating liquid and a post-coating liquid, the presence or absence of an interface was observed in the microporous film made of polypropylene resin.

Evaluation Criteria a: No interface is observed.

b: An interface is observed.

Evaluation of Porosity

The porous structure was filled with an unsaturated fatty acid (e.g., commercially available butter) and stained with osmium, then an internal cross-sectional structure was cut out using an FIB and observed with SEM to measure the porosity. The porosity was measured in each of the cured region of the pre-coating liquid and the cured region of the post-coating liquid. The results of porosity are presented in Tables 2 to 3 according to the following evaluation criteria. In Comparative Examples 5 to 8 in which the post-coating liquid was not used, there was no cured region of the post-coating liquid, so the result was indicated as "-" in Table 3. In Comparative Example 9 in which any pre-coating liquid and any post-coating liquid were not used not to form an insulating layer, the porosity in the microporous film made of polypropylene resin was measured.

Evaluation Criteria a: Porosity is 30% or more.

b: Porosity is less than 30%.

Evaluation of Strength

A test was conducted in which an adhesive tape was attached to the surface of the porous structure and then peeled off After that, a cross-section of the porous structure was prepared, and the position of the surface peeled in this test was observed with SEM. The results are presented in Tables 2 to 3 according to the following evaluation criteria. Since this evaluation is for determining the strength between the cured region of the pre-coating liquid and the cured region of the post-coating liquid (including the interface), Comparative Examples 5 to 8 and 9 were not subjected to this test. Therefore, the results of Comparative Examples 5 to 8 and 9 were indicated as "-" in Table 3.

Evaluation Criteria a: No peeling has occurred, or peeling has occurred at a position other than a region (including the interface) between the cured region of the pre-coating liquid and the cured region of the post-coating liquid.

b: Peeling has occurred at a region (including the interface) between the cured region of the pre-coating liquid and the cured region of the post-coating liquid.

Evaluation of Communicability

A cross-section of the porous structure was prepared and observed with SEM to confirm pore communicability between the cured region of the pre-coating liquid and the cured region of the post-coating liquid. The results are presented in Tables 2 to 3 according to the following evaluation criteria. Since this evaluation is for determining the communicability between the cured region of the pre-coating liquid and the cured region of the post-coating liquid (including the interface), Comparative Examples 5 to 8 and 9 were not subjected to this test. Therefore, the results of Comparative Examples 5 to 8 and 9 were indicated as "-" in Table 3.

Evaluation Criteria a: The pores between the cured region of the pre-coating liquid and the cured region of the post-coating liquid are continuously connected.

b: The pores between the cured region of the pre-coating liquid and the cured region of the post-coating liquid are not continuously connected.

Evaluation of Insulation at High Temperature

A copper foil is pressed against the insulating layer of each of the negative electrodes integrated with the porous structure (Examples 5 to 14 and Comparative Examples 5 to 8) and the negative electrode having the insulating layer thereon (Comparative Example 9), and heated at 200 degrees C. for 15 minutes. After that, a direct current resistance value between the copper foil and the negative electrode (i.e., between the electrodes) was measured to evaluate the shape maintaining function of the porous structure at high temperature. The results are presented in Tables 2 to 3 according to the following evaluation criteria.

Evaluation Criteria a: The direct current resistance value between the electrodes is 1 MΩ or more.

b: The direct current resistance value between the electrodes is 1 MΩ or more and less than 1 MΩ.

c: The direct current resistance value between the electrodes is less than 1 KΩ.

Evaluation of Impedance

First, the impedance of the above-prepared power storage element was measured at 25 degrees C. Next, the power storage element was heated at 200 degrees C. for 15 minutes, then cooled to 25 degrees C., and the impedance was measured at 25 degrees C. again to evaluate the shutdown function of the porous structure at high temperature. The results are presented in Tables 2 to 3 according to the following evaluation criteria.

Evaluation Criteria a: The impedance value after heating is 10 times or more that before heating.

b: The impedance value after heating is less than 10 times that before heating.

TABLE 1

| | | Pre-coating liquid | | | | | | | | | |
|---|---|---|---|---|---|---|---|---|---|---|---|
| | | E1 | E2 | E3 | E4 | E15 | E16 | C1 | C2 | C3 | C4 |
| Polymerizable compound | Tricyclodecane dimethanol diacrylate | 29.0 | 29.0 | | 29.0 | 29.0 | 29.0 | 29.0 | 29.0 | | 29.0 |
| | Tris(2-hydroxyethyl) isocyanurate triacrylate | | | 29.0 | | | | | | 29.0 | |
| | EBECRYL 4101 | | | | | | | | | | |
| | EBECRYL 4201 | | | | | | | | | | |
| Porogen | Dipropylene glycol monomethyl ether | 70.0 | 70.0 | 70.0 | 70.0 | 70.0 | 70.0 | 70.0 | 70.0 | 70.0 | 70.0 |
| Polymerization initiator | IRGACURE 184 | 1.0 | 1.0 | 1.0 | | | 1.0 | 1.0 | 1.0 | 1.0 | |
| | IRGACURE TPO | | | | 1.0 | 1.0 | | | | | 1.0 |
| | Viscosity | a | a | a | a | a | a | a | a | a | a |

| | | Post-coating liquid | | | | | | | | | |
|---|---|---|---|---|---|---|---|---|---|---|---|
| | | E1 | E2 | E3 | E4 | E15 | E16 | C1 | C2 | C3 | C4 |
| Polymerizable compound | Tricyclodecane dimethanol diacrylate | | 29.0 | 29.0 | 29.0 | 59.0 | 59.0 | | 29.0 | 29.0 | 29.0 |
| | Tris(2-hydroxyethyl) isocyanurate triacrylate | 29.0 | | | | | 29.0 | | | | |
| | EBECRYL 4101 | | | | | | | | | | |
| | EBECRYL 4201 | | | | | | | | | | |
| Porogen | Dipropylene glycol monomethyl ether | 70.0 | 70.0 | 70.0 | 70.0 | 40.0 | 40.0 | 70.0 | 70.0 | 70.0 | 70.0 |
| Polymerization initiator | IRGACURE 184 | 1.0 | | 1.0 | 1.0 | 1.0 | | 1.0 | | 1.0 | 1.0 |
| | IRGACURE TPO | | 1.0 | | | | 1.0 | | 1.0 | | |
| | Viscosity | a | a | a | a | a | a | a | a | a | a |

TABLE 1-continued

|  |  |  | Examples Porous structure | | | | | | Comparative Examples Porous structure | | | |
| --- | --- | --- | --- | --- | --- | --- | --- | --- | --- | --- | --- | --- |
|  |  |  | 1 | 2 | 3 | 4 | 15 | 16 | 1 | 2 | 3 | 4 |
| Evaluation results | Glass transition temperature or melting point [deg. C.] | Cured region of pre-coating liquid | — | — | — | — | — | — | — | — | — | — |
|  |  | Cured region of post-coating liquid | — | — | — | — | — | — | — | — | — | — |
|  | Porosity | Cured region of pre-coating liquid | a | a | a | a | a | a | a | a | a | a |
|  |  | Cured region of post-coating liquid | a | a | a | a | a | a | a | a | a | a |
|  | Presence or absence of interface |  | a | a | a | a | a | a | b | b | b | b |
|  | Strength |  | a | a | a | a | a | a | b | b | b | b |
|  | Communicability |  | a | a | a | a | a | a | b | b | b | b |
|  | Insulation at high temperature |  | — | — | — | — | — | — | — | — | — | — |
|  | Impedance |  | — | — | — | — | — | — | — | — | — | — |

TABLE 2

|  |  | Pre-coating liquid | | | | | | | |
| --- | --- | --- | --- | --- | --- | --- | --- | --- | --- |
|  |  | E5 | E6 | E7 | E8 | E9 | E10 | E11 | E12 |
| Polymerizable compound | Tricyclodecane dimethanol diacrylate | 29.0 |  |  |  | 29.0 |  |  |  |
|  | Tris(2-hydroxyethyl) isocyanurate triacrylate |  | 29.0 |  |  |  | 29.0 |  |  |
|  | EBECRYL 4101 |  |  | 29.0 | 29.0 |  |  |  |  |
|  | EBECRYL 4201 |  |  |  |  |  |  | 29.0 | 29.0 |
| Porogen | Dipropylene glycol monomethyl ether | 70.0 | 70.0 | 70.0 | 70.0 | 70.0 | 70.0 | 70.0 | 70.0 |
| Polymerization initiator | IRGACURE 184 | 1.0 | 1.0 | 1.0 | 1.0 | 1.0 | 1.0 | 1.0 | 1.0 |
|  | IRGACURE TPO |  |  |  |  |  |  |  |  |
|  | Viscosity | a | a | a | a | a | a | a | a |

|  |  | Post-coating liquid | | | | | | | |
| --- | --- | --- | --- | --- | --- | --- | --- | --- | --- |
|  |  | E5 | E6 | E7 | E8 | E9 | E10 | E11 | E12 |
| Polymerizable compound | Tricyclodecane dimethanol diacrylate |  |  | 29.0 |  |  |  | 29.0 |  |
|  | Tris(2-hydroxyethyl) isocyanurate triacrylate |  |  |  | 29.0 |  |  |  | 29.0 |
|  | EBECRYL 4101 | 29.0 | 29.0 |  |  |  |  |  |  |
|  | EBECRYL 4201 |  |  |  |  | 29.0 | 29.0 |  |  |
| Porogen | Dipropylene glycol monomethyl ether | 70.0 | 70.0 | 70.0 | 70.0 | 70.0 | 70.0 | 70.0 | 70.0 |
| Polymerization initiator | IRGACURE 184 | 1.0 | 1.0 | 1.0 | 1.0 | 1.0 | 1.0 | 1.0 | 1.0 |
|  | IRGACURE TPO |  |  |  |  |  |  |  |  |
|  | Viscosity | a | a | a | a | a | a | a | a |

|  |  |  | Examples (Power storage element) | | | | | | | |
| --- | --- | --- | --- | --- | --- | --- | --- | --- | --- | --- |
|  |  |  | 5 | 6 | 7 | 8 | 9 | 10 | 11 | 12 |
| Evaluation results | Glass transition temperature or melting point [deg. C.] | Cured region of pre-coating liquid | 190 | 272 | 22 | 22 | 190 | 272 | 12 | 12 |
|  |  | Cured region of post-coating liquid | 22 | 22 | 190 | 272 | 12 | 12 | 190 | 272 |

TABLE 2-continued

|  |  | | | | | | | | |
|---|---|---|---|---|---|---|---|---|---|
| Porosity | Cured region of pre-coating liquid | a | a | a | a | a | a | a | a |
|  | Cured region of post-coating liquid | a | a | a | a | a | a | a | a |
| Presence or absence of interface | | a | a | a | a | a | a | a | a |
| Strength | | a | a | a | a | a | a | a | a |
| Communicability | | a | a | a | a | a | a | a | a |
| Insulation at high temperature | | a | a | a | a | a | a | a | a |
| Impedance | | a | a | a | a | a | a | a | a |

TABLE 3

|  |  | Pre-coating liquid | | | | | |
|---|---|---|---|---|---|---|---|
|  |  | C5 | C6 | C7 | C8 | E13 | E14 |
| Polymerizable compound | Tricyclodecane dimethanol diacrylate | 30.0 |  |  |  | 29.0 | PP resin Insulating layer |
|  | Tris(2-hydroxyethyl) isocyanurate triacrylate |  | 29.0 |  |  |  | 29.0 |
|  | EBECRYL 4101 |  |  | 29.0 |  |  |  |
|  | EBECRYL 4201 |  |  |  | 29.0 |  |  |
| Porogen | Dipropylene glycol monomethyl ether | 69.0 | 70.0 | 70.0 | 70.0 | 70.0 | 70.0 |
| Polymerization initiator | IRGACURE 184 | 1.0 | 1.0 | 1.0 | 1.0 | 1.0 | 1.0 |
|  | IRGACURE TPO |  |  |  |  |  |  |
| Viscosity |  | a | a | a | a | a | a |

|  |  | Post-coating liquid | | | | | |
|---|---|---|---|---|---|---|---|
|  |  | C5 | C6 | C7 | C8 | E13 | E14 |
| Polymerizable compound | Tricyclodecane dimethanol diacrylate | None | None | None | None |  | 29.0 |
|  | Tris(2-hydroxyethyl) isocyanurate triacrylate |  |  |  |  | 29.0 |  |
|  | EBECRYL 4101 |  |  |  |  |  |  |
|  | EBECRYL 4201 |  |  |  |  |  |  |
| Porogen | Dipropylene glycol monomethyl ether |  |  |  |  | 70.0 | 70.0 |
| Polymerization initiator | IRGACURE 184 |  |  |  |  | 1.0 | 1.0 |
|  | IRGACURE TPO |  |  |  |  |  |  |
| Viscosity |  |  |  |  |  | a | a |

|  |  |  | Comparative Examples (Power storage element) | | | | Examples (Power storage element) | | Comparative Examples (Power storage element) |
|---|---|---|---|---|---|---|---|---|---|
|  |  |  | 5 | 6 | 7 | 8 | 13 | 14 | 9 |
| Evaluation results | Glass transition temperature or melting point [deg. C.] | Cured region of pre-coating liquid | 190 | 272 | 22 | 12 | 190 | 272 | 140 |
|  |  | Cured region of post-coating liquid | — | — | — | — | 272 | 190 |  |
|  | Porosity | Cured region of pre-coating liquid | a | a | a | a | a | a | a |
|  |  | Cured region of post-coating liquid | — | — | — | — | a | a |  |
|  | Presence or absence of interface |  | — | — | — | — | a | a | a |
|  | Strength |  | — | — | — | — | a | a | — |
|  | Communicability |  | — | — | — | — | a | a | — |
|  | Insulation at high temperature |  | a | a | c | c | a | a | c |
|  | Impedance |  | b | b | a | a | b | b | a |

According to Table 1, the porous structures of Examples 1 to 4 and 15 to 16 have excellent strength and communicability. The reason for this is considered that, because the pre-coating liquid and the post-coating liquid corresponding to the liquid composition A and the liquid composition B, respectively, were in contact with each other before being cured and were cured at the same time, the resulted porous structure portions were continuously integrated and no interface was formed.

Comparative Examples 1 to 4 are inferior to Examples 1 to 4 and 15 to 16 in strength and communicability although the pre-coating liquid and post-coating liquid used are composed of similar constituents. The reason for this is considered that, because the pre-coating liquid and the post-coating liquid were cured at different timings and then laminated, the resulted porous structures were not continuously integrated and an interface was formed.

According to Tables 2 to 3, the porous structures of the power storage elements of Examples 5 to 14 have excellent strength and communicability. The reason for this is considered that, because the pre-coating liquid and the post-coating liquid corresponding to the liquid composition A and the liquid composition B, respectively, were in contact with each other before being cured and were cured at the same time, the resulted porous structure portions were continuously integrated and no interface was formed.

According to Table 2, the power storage elements of Examples 5 to 12 have excellent insulation and impedance at high temperature. The excellent insulation at high temperature indicates that the shape maintaining function of the porous structure is excellent at high temperature. The reason for this is considered that, because at least a part of the porous structure is formed of a resin having a high glass transition temperature or melting point, the porous structure was suppressed from deforming even at high temperature. The excellent impedance indicates that the shutdown function of the porous structure is excellent at high temperature. The reason for this is considered that, because at least a part of the porous structure is formed of a resin having a low glass transition temperature or melting point, the pores inside the porous structure were closed by the melted resin at high temperature.

According to Table 3, the power storage elements of Comparative Examples 5 to 8 were prepared without using any post-coating liquid. Therefore, these power storage elements do not contain a porous structure including a plurality of porous structure portions formed of resins composed of different constituents. Therefore, these power storage elements are inferior in insulation or impedance at high temperature. The reason for this is considered that the resulted porous structure contains only one of a resin having a high glass transition temperature or melting point and a resin having a low glass transition temperature or melting point.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A porous structure having pores communicating with each other, comprising:
   a porous structure portion A comprising a resin A; and
   a porous structure portion B comprising a resin B,
   wherein the porous structure portion A and the porous structure portion B are continuously integrated via a resin having a chemical structure gradually changing from a chemical structure similar to the resin A to chemical structure similar to the resin B,
   wherein the resin A and the resin B are composed of different constituents,
   wherein at least one of the resin A and the resin B includes an intramolecular cross-linked structure, and,
   wherein the resin A has a glass transition temperature or melting point of 160 degrees C. or higher and the resin B has a glass transition temperature or melting point of lower than 160 degrees C.,
   wherein the resin A comprises an acrylate resin, methacrylate resin, urethane acrylate resin, or vinyl ester resin, and
   wherein the resin B comprises an acrylate resin, methacrylate resin, urethane acrylate resin, or vinyl ester resin.

2. A porous structure having pores communicating with each other, comprising:
   a porous structure portion A comprising a resin A; and
   a porous structure portion B comprising a resin B,
   wherein the porous structure portion A and the porous structure portion B are continuously integrated via a resin having a chemical structure gradually changing from a chemical structure similar to the resin A to chemical structure similar to the resin B,
   wherein the resin A and the resin B are composed of different constituents,
   wherein at least one of the resin A and the resin B includes an intramolecular cross-linked structure, and
   wherein a glass transition temperature or melting point of the resin A is higher than a glass transition temperature or melting point of the resin B by 20 degrees C. or more,
   wherein the resin A comprises an acrylate resin, methacrylate resin, urethane acrylate resin, or vinyl ester resin, and
   wherein the resin B comprises an acrylate resin, methacrylate resin, urethane acrylate resin, or vinyl ester resin.

3. The porous structure of claim 2, wherein a glass transition temperature or melting point of the resin A is higher than a glass transition temperature or melting point of the resin B by 50 degree C. or more.

4. The porous structure of claim 2, wherein a glass transition temperature or melting point of the resin A is higher than a glass transition temperature or melting point of the resin B by 100 degrees C. or more.

5. An insulating layer, comprising: the porous structure of claim 2.

6. An electrode, comprising:
   an electrode substrate;
   an electrode mixture part over the electrode substrate, the electrode mixture part containing an active material; and
   the porous structure of claim 2 over the electrode mixture part.

7. The electrode of claim 6, wherein a part of the porous structure and a part of the electrode mixture part are overlapped.

8. A power storage element, comprising: the electrode of claim 6.

9. A carrier comprising:
   the porous structure of claim 2; and
   a functional substance carried by at least one of the porous structure portion A and the porous structure portion B.

10. A separation layer, comprising:
    the porous structure of claim 2,
    wherein the separation layer allows a fluid to permeate,
    wherein at least one of the porous structure portion A and the porous structure portion B separates a predetermined substance contained in the fluid when the fluid permeates the separation layer.

11. A reaction layer comprising:
    the porous structure of claim 2,
    wherein the reaction layer allows a fluid to permeate,
    wherein at least one of the porous structure portion A and the porous structure portion B provides a reaction field for the fluid when the fluid permeates the reaction layer.

12. The porous structure of claim 2, produced by a method comprising:
    applying a curable liquid composition A to form the porous structure portion A;
    applying a curable liquid composition B to form the porous structure portion B; and
    simultaneously curing the curable liquid composition A and the curable liquid composition B in contact with each other,
    wherein the curable liquid composition A and the curable liquid composition B have different compositions.

13. The porous structure of claim 2, wherein the porous structure does not have an interface.

14. A method for manufacturing the porous structure of claim 2, comprising:
    applying a curable liquid composition A to form the porous structure portion A;
    applying a curable liquid composition B to form the porous structure portion B; and
    simultaneously curing the curable liquid composition A and the curable liquid composition B in contact with each other,
    wherein the curable liquid composition A and the curable liquid composition B have different compositions,
    thereby forming said porous structure having pores communicating with each other, comprising:
    said porous structure portion A comprising said resin A; and
    said porous structure portion B comprising said resin B,
    wherein the porous structure portion A and the porous structure portion B are continuously integrated via a resin having a chemical structure gradually changing from a chemical structure similar to the resin A to chemical structure similar to the resin B,
    wherein the resin A and the resin B are composed of different constituents,
    wherein at least one of the resin A and the resin B includes the intramolecular cross-linked structure, and
    wherein the glass transition temperature or melting point of the resin A is higher than a glass transition temperature or melting point of the resin B by 20 degrees C. or more,
    wherein the resin A comprises the acrylate resin, methacrylate resin, urethane acrylate resin, or vinyl ester resin, and
    wherein the resin B comprises the acrylate resin, methacrylate resin, urethane acrylate resin, or vinyl ester resin.

15. The method of claim 14,
    wherein the applying of the curable liquid composition A includes discharging of the curable liquid composition A by an inkjet method,
    wherein the applying of the curable liquid composition B includes discharging of the curable liquid composition B by an inkjet method.

16. The method of claim 14, wherein the curable liquid composition A and the curable liquid composition B each have a viscosity of from 1 to 20 mPa s at 25 degrees C.

* * * * *